(12) United States Patent
Shilpiekandula et al.

(10) Patent No.: US 9,261,872 B2
(45) Date of Patent: Feb. 16, 2016

(54) SYSTEM AND METHOD FOR CONTROLLING REDUNDANT ACTUATORS OF A MACHINE

(75) Inventors: Vijay Shilpiekandula, Boston, MA (US); Scott A. Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1012 days.

(21) Appl. No.: 13/354,113

(22) Filed: Jan. 19, 2012

(65) Prior Publication Data

US 2013/0190898 A1 Jul. 25, 2013

(51) Int. Cl.
*G05B 19/19* (2006.01)
(52) U.S. Cl.
CPC ..................... *G05B 19/19* (2013.01)
(58) Field of Classification Search
CPC ............... G05B 13/00; G06F 19/00
USPC ............................ 700/19, 109, 103
See application file for complete search history.

(56) References Cited

U.S. PATENT DOCUMENTS 5,430,643 A * 7/1995 Seraji ........................... 700/263

FOREIGN PATENT DOCUMENTS

| EP | 1758003 A1 * | 2/2007 |
| EP | 2037220 A2 * | 3/2009 |

OTHER PUBLICATIONS

Dewey et al., "Experimental and Theoretical results in output-trajectory design for flexible structures". Dec. 1998. ASME Journal of Dynamic Systems, Measurement and Control. vol. 120, pp. 456-461.*
McNab et al., "Receding time horizon linear quadratic optimal control for multi-axis contour tracking motion control". Jun. 2000. Journal of Dynamic Systems, Measurement, and Control. vol. 122, pp. 375-381.*
Yildiz et al., "A Control Allocation System for Automatic Detection and Compensation of Phase Shift Due to Actuator Rate Limiting". Jun. 2011. 2011 American Control Conference. pp. 444-449.*
Ur-Rehman, Raza et al. "Multi-objective Path Placement Optimization of Parallel Kinetics Machines Based on Energy Consumption, Shaking Forces and Maximum Actuator Torques: Application to the Orthoglide," <echanism and Machine Theory, Pergamom, Amsterdam, NL. vol. 45, No. 8. Aug. 1, 2010.
Ping Hsu et al. "Dynamic Control of Redundant Manipulators," American Control Conference, 1988, IEEE, Piscataway, NJ, US. Jun. 15, 1988.

* cited by examiner

*Primary Examiner* — Kakali Chaki
*Assistant Examiner* — Fenyang Stewart
(74) *Attorney, Agent, or Firm* — Dirk Brinkman; Gene Vinokur

(57) ABSTRACT

A method controls redundant actuators of a machine based on a reference trajectory. The method determines a cost function representing operations of the redundant actuators and minimizes the cost function subject to constraints to produce a sequence of commands for each actuator. The redundant actuators are controlled according to the sequences of commands.

18 Claims, 18 Drawing Sheets

100

200

500

600

800

SYSTEM AND METHOD FOR CONTROLLING REDUNDANT ACTUATORS OF A MACHINE

FIELD OF THE INVENTION

This invention relates generally to a system and a method for controlling redundant actuators of a machine, and more particularly to controlling the actuators based on a reference trajectory.

BACKGROUND OF THE INVENTION

Common methods for operating laser cutting machines perform two-dimensional (2D) relative motion between a laser beam and a workpiece, such that the laser beam cuts the workpiece as the beam moves. In such machines, there are three options. A position of the laser is fixed and the workpiece is moved in X and Y directions. A position of the workpiece is fixed and the laser or a mirror in the beam path is moved in the X and the Y directions. The laser is fixed in the Y direction and the beam in the X direction, and the workpiece is fixed in X direction and moves in Y direction.

A limiting factor on the production rate of electromechanical machine, such as laser cutting machines, is directly related to the inertia of the components of the laser-cutting machine. Therefore, reduction of the effective inertia of the components has a direct impact on the productivity of the laser-cutting machine. Such reduction can be achieved by using redundant actuators along each direction of the motion.

For example, one laser cutting machine uses a pair of redundant actuators along the direction of the motion, i.e., a planar gantry with a high inertia and a polar gantry with a low inertia. However, the inertia of the laser even in this machine is still relatively large, as the laser-focusing lens itself is moved. Such motion also stresses the precision optics of the laser-focusing lens and may lead to a suboptimal cut.

Another possible method of reducing inertia is to replace the X-Y motion completely with a pair of mirrors moved by galvano drives. With a suitable choice of lenses and lasers, these XY galvano assemblies can be used in the machine with redundant actuators as beam directors, or as laser engraving devices.

For example, one machine with redundant actuators places the XY galvano scanhead on the end of a multi-axial industrial robot arm. The path of the robot end is then constrained to stay within a "mobility tube" describing the set of positions where the galvano scanhead is capable of aiming at the area to be machined. The correct set of multi-axial robot joint motions, combined with the proper galvano drive signals are dynamically determined by the control unit.

However, avoidance of "robot arm crashes" in this design, i.e., situations where the robot arm tries to pass through itself or through the workpiece, is computationally difficult, and requires not only an accurate model of the robot arm and scanhead, but also a continuously evolving model of the workpiece during different stages of the cutting process, because a forbidden motion at one stage in the cutting process may be available for another stage of the process. Accordingly, controlling the machine with redundant actuators is a challenging problem.

For example, in one method for controlling redundant actuators, i.e., a fast actuator and a slow actuator, the coordinated control of the redundant actuators is achieved by frequency separation. Because the slow actuator travels large ranges of motion at relatively low speeds when compared with the fast actuator, the slow actuator cannot follow the high frequency components of the reference trajectory. Accordingly, the reference trajectory is processed by low and high pass filters, such that the output of the low pass filter is submitted to the slow actuator and the output of the high pass filter is submitted to the fast actuator. However, that method does not explicitly handle the position constraints of the fast actuator. Too low a cut off frequency results in fast actuator position constraint violations. On the other hand, too high a cut-off frequency results in slow actuator carrying out most of the cutting motions, thus defeating the purpose of the frequency separation method.

In another method for controlling redundant actuators in a laser cutting machine, a pseudo-inverse of a Jacobian matrix of the redundant configuration is used to compute joint profiles needed to position the fast actuator. That method only accounts for kinematics of the system while neglecting the dynamics of the actuators. Moreover, there are no guarantees that physical constraints of the actuators are violated, which can lead to the situations where the slow actuator moves beyond the range of the fast actuator and the error in tracking the reference trajectory becomes unbounded.

Accordingly, there is a need to overcome the disadvantages described above.

SUMMARY OF THE INVENTION

It is an object of various embodiments of the invention to provide a system and a method for controlling redundant actuators. It is further an object of the invention to control the actuators such that the reference trajectory is accurately traversed during the operations. It is further an object of one embodiment of the invention to coordinate the motions of the redundant actuators such that the reference trajectory is traversed without resulting in mechanical crashes.

It is further an object of one embodiment of the invention to minimize vibrations resulting from the motions of the redundant actuators. It is further an object of the invention to minimize energy consumed during the operation in traversing the reference trajectory. It is further an object of the invention to guarantee that various mechanical constraints such as velocity, acceleration, and torque limits on the redundant actuators are not violated.

It is further an object of the invention to control concurrently the motion of the redundant actuators such cross coupling between the actuators is minimized. It is further an object of the invention to provide such a method for controlling the redundant actuators that are tunable in dependence of the requirements and is simple to use.

The operation of such redundant actuators is complicated by the fact that each point on the reference trajectory representing, e.g., a cutting path for a laser cutting machine, can be achieved by various, i.e., not unique, combinations of motions of the redundant actuators. This fact poses a problem of coordinated control for the redundant actuators, e.g., by determining an optimal sequence of controls for each actuator.

Various embodiments of the invention are based on a realization that the problem of coordinated control of the redundant actuators can be reduced to an optimization problem. Specifically, the operation of the redundant actuators can be defined as a cost function to be optimized, e.g., minimized, subject to constraints, wherein the constraints are based on mechanics of the actuators and, importantly, the reference trajectory itself. Moreover, such formulation includes in the cost function various components responsible for different aspects of the performance of the machine, such as accuracy, vibration and or energy consumption during the operation.

Usage of the reference trajectory as a constraint allows for penalizing the deviation from the trajectory. Similarly, the usage of the mechanics of the redundant actuators, e.g., physical limits of the redundant actuators and the machine, as the constraint ensures feasibility of the controlling. Furthermore, formulating the control problem as the optimization of the cost function makes the problem amenable to various optimization approaches, which can speed up and/or simplify the computation.

For example, one embodiment of the invention controls the redundant actuators by optimizing, e.g., minimizing, a cost function representing operations of the redundant actuators. The cost function is minimized subject to constraints to produce a sequence of commands for each actuator. The constraints include at least one time-varying constraint representing the reference trajectory and at least one time-fixed constraint representing mechanics of the redundant actuators.

Specifically, because the time-varying constraint is imposed on the combined motion of the redundant actuators by the reference trajectory itself, the reference trajectory is followed over its entirety without any loss of motion. This constraint is time-varying, because the reference trajectory is a function of time. Without such constraint, the actuators can stray away from the reference trajectory resulting in unbounded tracking errors, which in turn causes dimensional inaccuracies for the work piece as a result of the cutting and may cause a mechanical collision of the actuators.

A time-fixed constraint represents a physical limit of the redundant actuators. For example, in one embodiment the time-fixed constraint is imposed by the velocity of the actuators. Specifically, the slow actuators of a redundant system can represent bottlenecks that have to be accounted for. Otherwise, the fast actuator can position the laser so rapidly that the slow actuator cannot catch up to move the fast actuator to another location, which is beyond the limited reach of the fast actuator. Hence, one embodiment of the invention explicitly imposes velocity constraint of each actuator for substantially coordinating the concurrent motions of the redundant actuators.

Similarly, another embodiment imposes torque limits on the actuators. Violating these limits can result in excessive heating of the actuators, which can result in irreparable damage to internal components, such as armature windings, of the actuators. Often times, safety mechanisms, such as overdrive protection, are built into most servo actuator drivers when peak torques are reached, which may result in automatic shut-down of the machine. Hence, the embodiment explicitly imposes the torque constraint for each actuator for minimizing the cost function.

Accordingly, in various embodiments, the position deviation of the redundant actuators from the reference trajectory is minimized subject to constraints imposed by position, velocity, acceleration and torque of the actuators.

In some embodiments of the invention, the cost function includes a component representing the energy consumed by the redundant actuators during the operation. This embodiment not only optimizes the energy consumption, but also results in smooth motions for at least slow actuators. This is because by minimizing the energy consumed, the embodiment of the invention implicitly penalizes abrupt changes in curvature of the trajectory, which in turn implies that the erratic components of the trajectory are flattened out and imposed on the slow actuators, while the residual motions are carried out by the fast axis. Thus, vibrations in the slow actuator are reduced, thereby ensuring that wear and tear is minimized.

In yet another embodiment, an explicit reduction in the frequency component of the actuator torque or displacement is achieved by penalizing a frequency-weighted term in the cost function that uses shaping filters, such as notch filters or band stop filters, for the weights.

In yet another embodiment, the cost function term that involves weighted norm of the torques also includes feedforward torques applied to negate a certain undesired motion of the actuator. By including such terms in the cost function, the embodiment allows for feed-forward terms that tackle both parasitic and cross-axis motions to be selectively tuned, ensuring that saturation of actuators is avoided, and corrective action for the undesirable motions are suitably achieved.

According to various embodiments, the cost function can be optimized online, i.e., in real time during the operation of the machine, or offline, i.e., before the operation of the machine.

For example, in one embodiment of the invention, the cost function is minimized subject to the specified constraints offline for a known reference trajectory. In another embodiment of the invention, the cost function is minimized subject to the specified constraints offline for a reference trajectory that is known only for a few samples ahead of the current time. In this embodiment, the minimization is performed over a future horizon based on a model of the redundant actuator, considering the dynamics and kinematics of the overall machine.

In yet another embodiment of the invention, the minimization is posed as a convex quadratic programming problem, which is solved using fast quadratic programming solvers. One particular solver is a parallel quadratic programming solver that converts the given quadratic program into a dual form that mathematically transforms the constraints to be in the positive cone. Parallel implementations offer the advantage of fast computation times, linear in the number of processors used.

In yet another embodiment of the invention, the cost function is minimized subject to the specified constraints in real-time for a known reference trajectory, or a for a reference trajectory that is known only for a few samples ahead of the current time.

Furthermore, various embodiments of the invention provide with a set of tuning parameters or gains that can address each of the aspects of the cost function and the constraints. Those embodiments are simple and preclude the need for explicit knowledge of operator(s).

DETAILED DESCRIPTION OF THE PREFERRED EMBODIMENT

Figure 1:
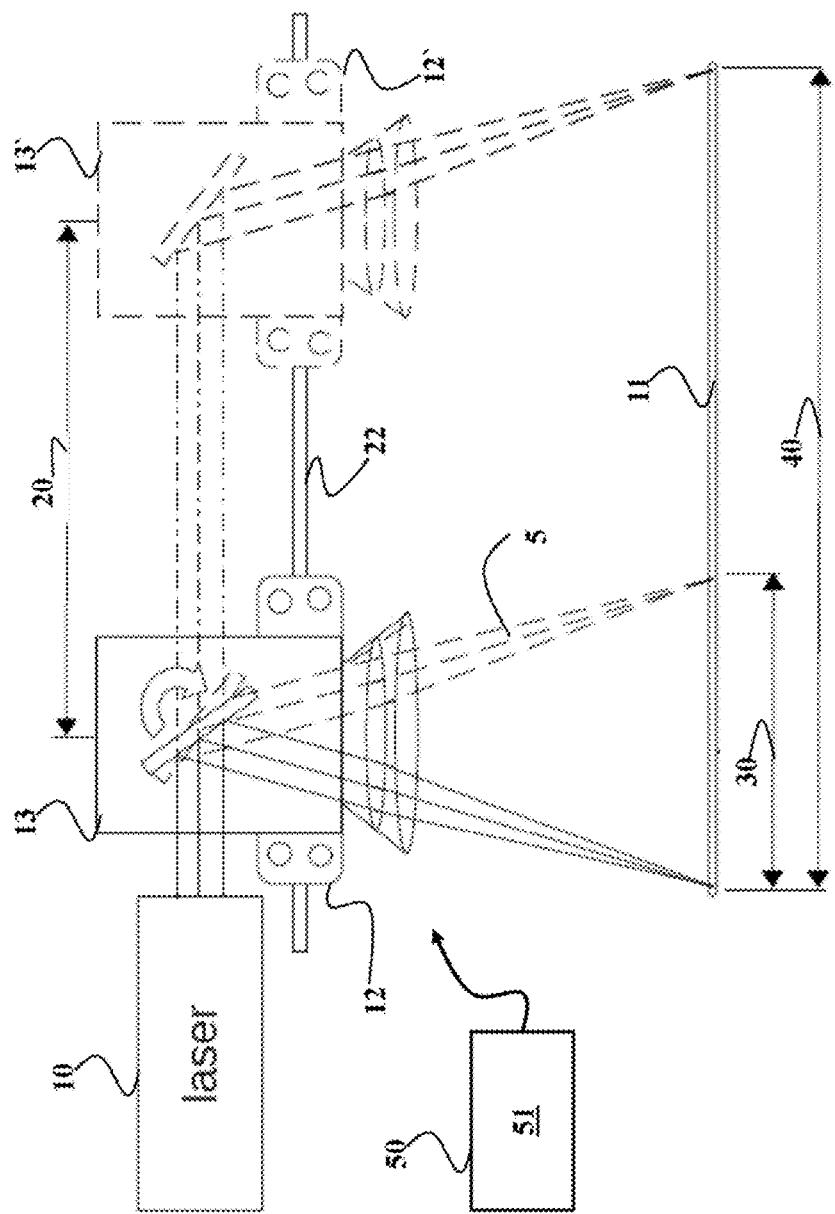
FIG. 1 is a block diagram of a laser cutting machine according to one embodiment of an invention.

FIG. 1 shows a block diagram of a machine having redundant actuators. The redundant actuators operate substantially concurrently for at least one direction of motion or operation. An example is a laser cutting machine 100. The laser cutting machine 100 is suitable for controlling a position of a beam produced by a laser 10 on a workpiece 11. The laser cutting machine 100 includes redundant actuators, i.e., a first actuator and a second actuator, such that a laser beam travels along a first direction 20. However, the principles of the invention can be employed by any type of redundant actuators.

The laser cutting machine includes a first actuator, i.e., a platform 12 configured to move along at least the first direction 20. The platform is moved by a motion system 22 for moving the platform in a plane parallel to the workpiece. In one embodiment, the motion system 22 includes a first prismatic joint facilitating a first motion of the platform along the first direction 20.

The laser cutting machine also includes a second actuator, i.e., a galvano assembly 13 arranged on the platform 12, such that the motion of the platform along the first direction 20 causes a motion of the galvano assembly along the first direction. The platform actuator is a slow actuator having high inertia. The galvano actuator is a fast actuator having low inertia. The platform and the galvano assembly operate for the same direction, and thus form the redundant actuators.

For example, the motion of the platform to a position 12' moves the galvano assembly to a position 13'. Also, an operation of the galvano assembly directs the laser beam to the workpiece along at least a second direction 30. The galvano assembly is arranged on the platform such that the second direction 30 is fixed with respect to the first direction 20, which allows directing the laser beam concurrently along the first direction and along the second direction. In various embodiments, the position of the laser beam on the workpiece is a vector sum 40 of the first motion, and the second motion. The motion of the platform and the operation of the galvano assembly are controlled by a control module 50. The control module 50 can be implemented using a processor 51.

Such arrangement of the galvano assembly on the platform precludes mechanical crashes of the galvano assembly with the platform during the operation of the laser cutting machine and allows for simplification of the controlling operation of the laser cutting machine. Moreover, such arrangement allows for summing the motions of the galvano assembly and the platform to reduce the time required for the laser cutting.

Other variations of the design of the laser cutting machine of FIG. 1, are possible and within the scope of the invention. For example, in some embodiment, the platform is configured to move in two directions and the motion system 22 includes a first prismatic joint facilitating a first motion of the platform along a first direction and a second prismatic joint facilitating a second motion of the platform along a second direction. Similarly, the galvano assembly may include a first mirror, wherein a third motion of the first mirror positions the laser beam along a third direction, and a second mirror, wherein a fourth motion of the second mirror positions the laser beam along a fourth direction. In such embodiments, the control module 50 controls concurrently the motion system and the galvano assembly, such that the position of the laser beam on the workpiece is a vector sum of the first motion, the second motion, the third motion, and the fourth motion.

Figure 2:
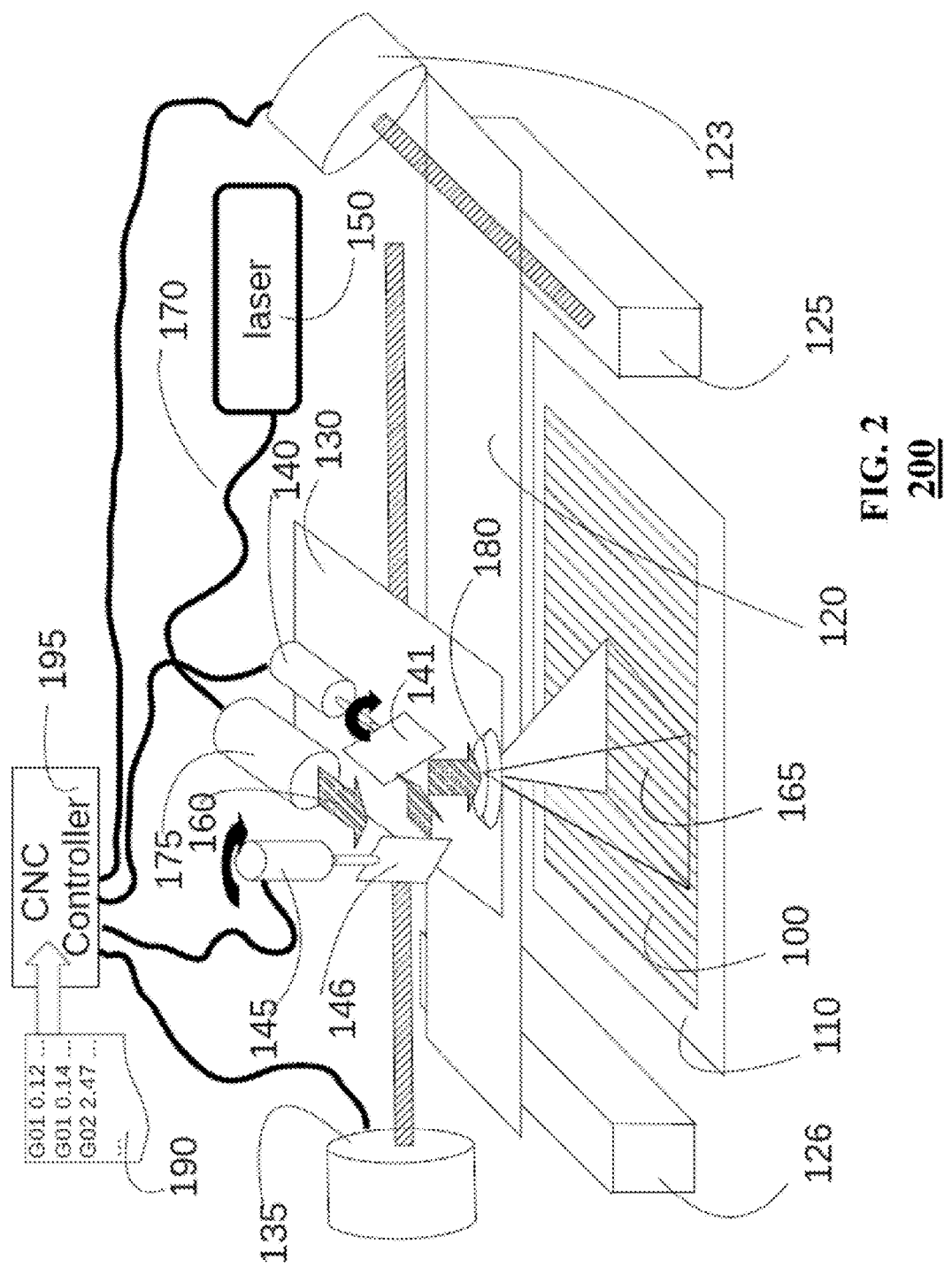
FIG. 2 is an isometric view of a laser cutting machine according to one embodiment of an invention.

FIG. 2 shows an isometric view of a laser cutting machine 200 according to one embodiment of an invention. The laser cutting machine 200 is shown for illustration purpose and is not intended to limit the scope of the invention.

A workpiece 100 is supported on a beam dump 110 beneath a gantry 120. The gantry moves on rails 125 and 126 along a first direction, e.g., along a Y-axis. The gentry 120 is moved along the first direction by a first servo motor and a first screw 123. A platform 130 is arranged on the gentry 120 and moves with the gentry along the first direction. Also, the platform 130 is moved along a second direction, e.g., along an X-axis, by a second servo motor and a second screw 135. In this embodiment, the gentry 120, the first servo motor and the first screw 123, and the second servo motor and the first screw 135 form a motion system for moving the platform in a plane parallel to the workpiece along the first and the second direction. However, other embodiments of the invention use different types of the prismatic joints to move the platform. For example, the first prismatic joint can include a first direction linear drive motor, and the second prismatic joint can include a second direction linear drive motor.

The galvano assembly, e.g., a two-axis galvano scan head having two orthogonal galvano drives, i.e., a first drive 140 and a second drive 145, a first mirror 141 and a second mirror 146, is arranged on the platform 130. A third motion of the first mirror 141 caused by the first driver 140 positions the laser beam along a third direction, and a fourth motion of the second mirror 146 caused by the second driver 145 positions the laser beam along a fourth direction.

In various embodiments, the galvano assembly is arranged on the platform such that the third direction is fixed with respect to the first direction, and the fourth direction is fixed with respect to the second direction. For example, in one embodiment, the first direction coincides with the third direction, and the second direction coincides with the fourth direction. In another embodiment, the first direction forms an angle of 45 degrees with the third direction, and the second direction forms the angle of 45 degrees with the fourth direction.

The galvano assembly can be affixed to the platform in order to fix the direction of motion. Alternatively, the galvano assembly can be arranged on the platform rotationally, such that the mutual orientations of the first, the second, the third, and the fourth directions can be fixed before, or during the operation of the laser cutting machine.

The laser cutting machine 200 can include a laser 150 for directing a cutting laser beam 160 to the first 141 and the second 146 mirrors of the galvano assembly via an optical fiber 170 and a collimator 175. In an alternative embodiment, the laser beam is directed to the galvano assembly via diagonal mirrors moving along the Y-gantry and X-axis platform. However, other variations are also possible.

The collimated cutting laser beam 160 is directed by the mirrors through a focusing module 180 for focusing the laser beam on the workpiece, producing a combined X-axis and Y-axis galvano assembly scan area 165 on the workpiece 100, and cutting the workpiece 100. An example of the focusing module 180 is a field-flattening F-theta lens or a non-telecentric F-theta lens. A size of the workpiece 100 can be greater than the galvano scan area 165 due to the motion of the platform.

In some embodiments, the control module includes a computer numerical control (CNC) controller 195. The control module controls the motion system and the galvano assembly according to precomputed G-code 190 that defines a trajectory of positions of the laser beam. For example, the G-code 190 encodes positions for the X-axis platform 140 as motion on the G-code axis X, the Y-axis gantry 120 as motion on G-code axis Y, X-motion galvano assembly and mirror 144 as motion on G-code axis A, and Y-motion galvano assembly and mirror 145 as motion on G-code axis B. This four-axis G-code is interpreted by the controller in during the operation of the laser cutting machine.

The interpretation of the G-code for the laser cutting machine has similarities with interpretation of the G-code for a milling machine with an extraordinarily fast trunnion table tilting in the A and B axes and having no motion in Z direction, other than "home to zero."

For example, the G-code actions such as an action G01, i.e., "interpolated linear motion," an action G02, i.e., "clockwise circular interpolation," and an action G03, i.e., "counterclockwise circular interpolation," can be directly performed by the laser cutter. Other G-code actions are mapped to the operations on the laser cutter. For example, an action M03, i.e., "set cutting spindle speed," can set a power of the laser, and an action M06, i.e., "tool change." is used to change lenses.

In the embodiment shown in FIG. 2, the galvano assembly is arranged on the platform such that the first direction coincides with the third direction, and the second direction coincides with the fourth direction.

Figure 3:
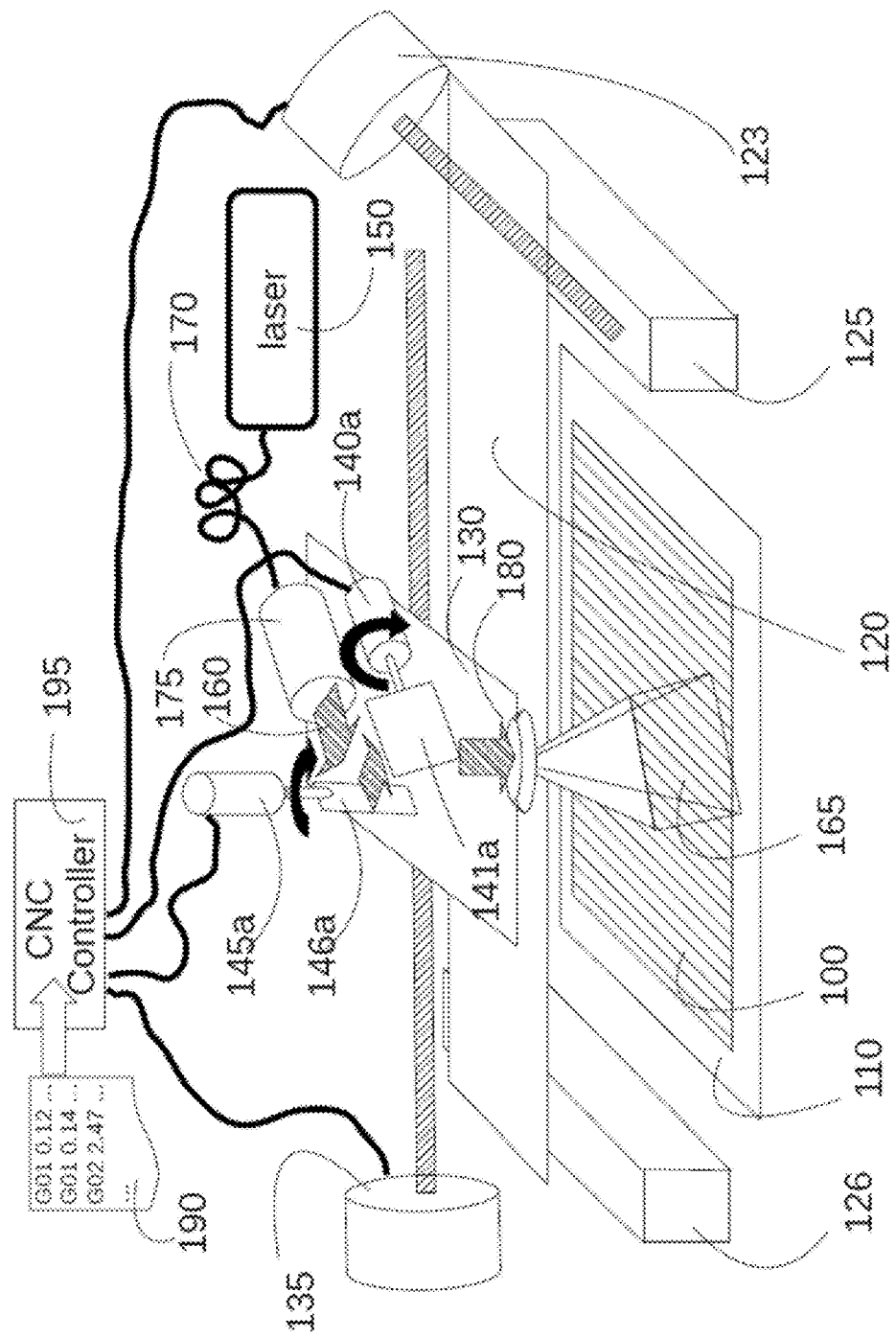
FIG. 3 is an isometric view of a laser cutting machine according to another embodiment of the invention.

FIG. 3 shows alternative embodiment, wherein the first direction forms an angle with the third direction, and the second direction forms an angle with the fourth direction.

For example, the galvano assembly and mirror drives referred, respectively, as 140, 141, 145, and 146 in FIG. 2, are rotated, in the embodiment of FIG. 3, with 45 degrees on a vertical axis and referred to as 140a, 141a, 145a, and 146a, respectively. For example, the first driver 140a and the first mirror 141a positioned such that the angle between the motion produced by the platform 130 along the first direction and the motion produced by the galvano assembly along the third direction, i.e., using the first driver 140a and the first mirror 141a, is approximately 45 degrees. Similarly, the second driver 145a and the second mirror 146a positioned such that the angle between the motion produced by the platform 130 along the second direction and the motion produced by the galvano assembly along the fourth direction, i.e., using the second driver 145a and the second mirror 146a, is approximately 45 degrees.

This embodiment is based on a realization that there is a preference of either vertical or horizontal (or nearly vertical or horizontal) lines of a cutting pattern. Because smaller details are cut at a high speed by the low-inertia galvano assembly, the maximum cutting speed for small details is proportional to the maximum acceleration that drivers of the galvano assembly can achieve without damage.

Figure 4:
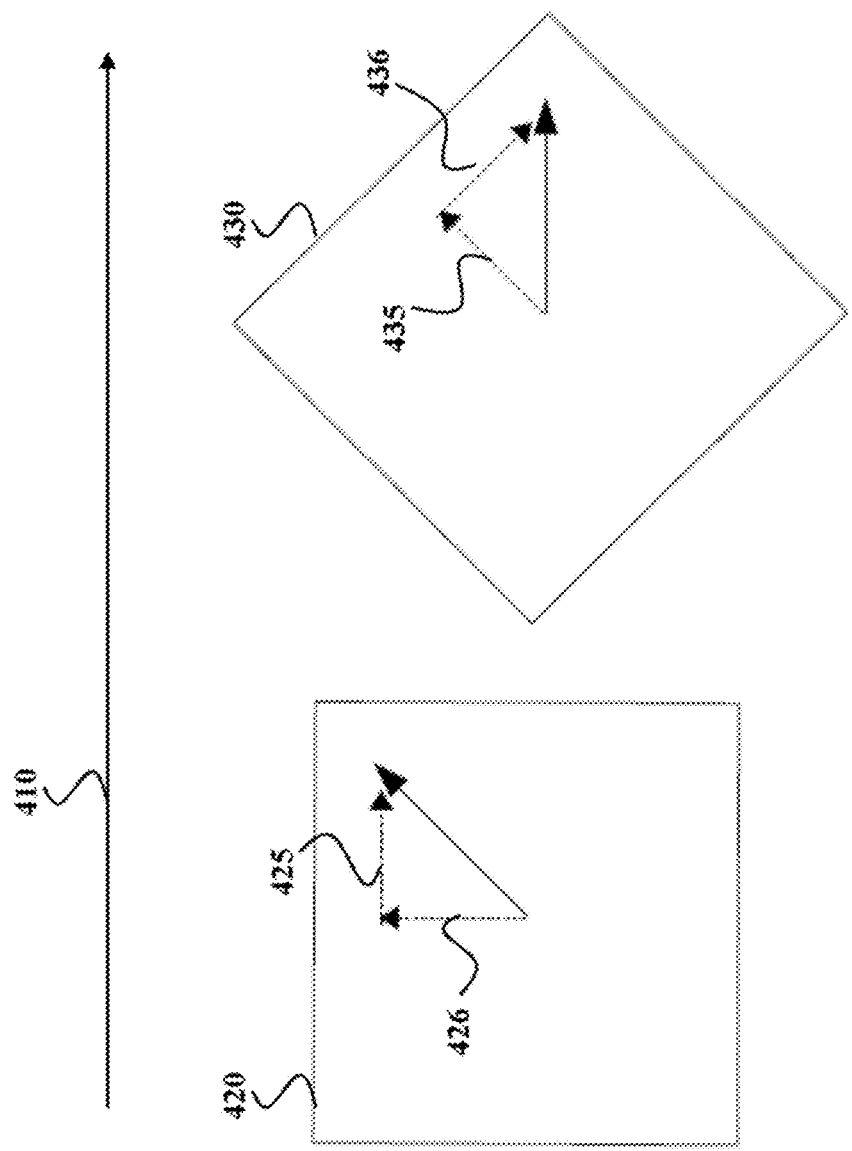
FIG. 4 is a schematic of a vector sum of the motions of positioning a laser beam according to some embodiments of the invention.

FIG. 4 shows the rationale for arranging the galvano assembly on the platform such that the motions of the galvano assembly are fixed with respect to the motions of the platform. For example, the platform has a motion along a direction 410, which is a common direction of a cutting pattern. Typically, the direction 410 is a vertical or horizontal direction in the coordinate system of the workpiece.

The galvano assembly is arranged on the platform such that the accelerations of the drivers of the galvano assembly results in the motion of the laser beam in addition to the motion of the platform. For example, the galvano assembly 420 is arranged such that acceleration of only one driver along the direction 425 contributes to the common motion of the laser beam along the direction 410. This is because the acceleration of another driver results in the motion of the laser beam along a direction 426 perpendicular to the direction 410.

In another example, the galvano assembly 430 is rotated 45 degrees on a vertical axis, such that the acceleration of driver's of the galvano assembly results in the motions along the direction 435 and 436 and can concurrently contribute to the motion of the laser beam along the direction 410. Because the acceleration of the laser beam is proportional to a Pythagorean sum of the two orthogonal galvano assembly, the horizontal and vertical cuts of the galvano assembly 430 can be performed approximately 1.41 times ($\sqrt{2}$) faster then cuts of the galvano assembly 420. Conversely, the more seldom-used diagonal cutting motions are now performed solely with a single galvano assembly motion, and are slower.

Figure 5:
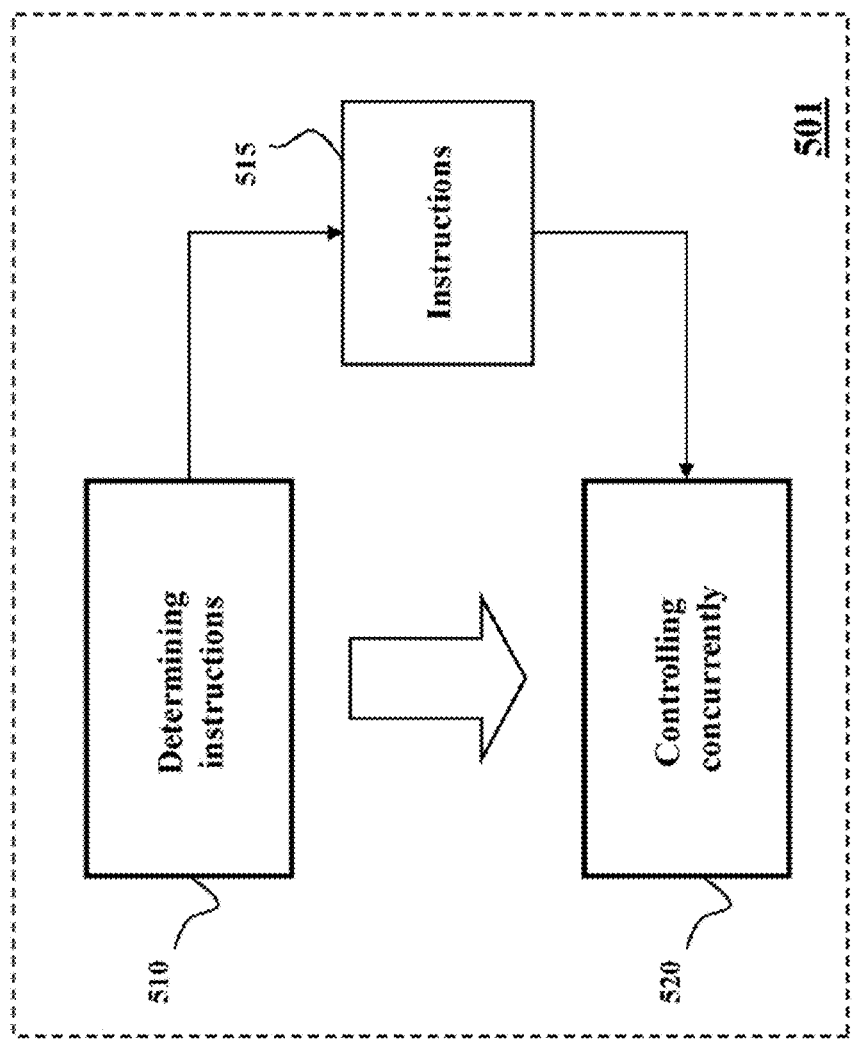
FIG. 5 is a block diagram of a method for controlling the operation of the laser-cutting machine according to some embodiments of the invention.

FIG. 5 shows a block diagram of a method 500 for controlling the operation of the laser-cutting machine. The laser cutting machine includes a galvano assembly arranged on the platform, such that a motion of the platform along a first direction and along a second direction causes a motion of the galvano assembly along the first and the second directions, wherein a motion of the galvano assembly directs a laser beam along a third direction, and along a fourth direction, and wherein mutual orientation of the first direction, the second direction, the third direction and the fourth direction is permanently fixed during the operation of the machine.

Typically before the beginning of the operation, instructions 515 for controlling the motion of the platform and the motion of the galvano assembly are determined 510. The instruction defines a cutting path of the laser beam, such that a position of the laser beam on the cutting path is a vector sum of the motions along the first direction, the second direction, the third direction and the fourth direction.

During the operation, the motion system and the motion of the galvano assembly are controlled concurrently 520 according to the instructions. In one embodiment, the instructions include G-code. The method 500 can be implemented using a processor 501. For example, the processor may be implemented as integrated circuits, with one or more processors in an integrated circuit component. Though, a processor may be implemented using circuitry in any suitable format.

Various embodiments of the system provide a system and a method that optimizes controlling the machine with redundant actuators according to some objectives of the invention.

System and Method for Controlling Redundant Actuators

Figure 6A:
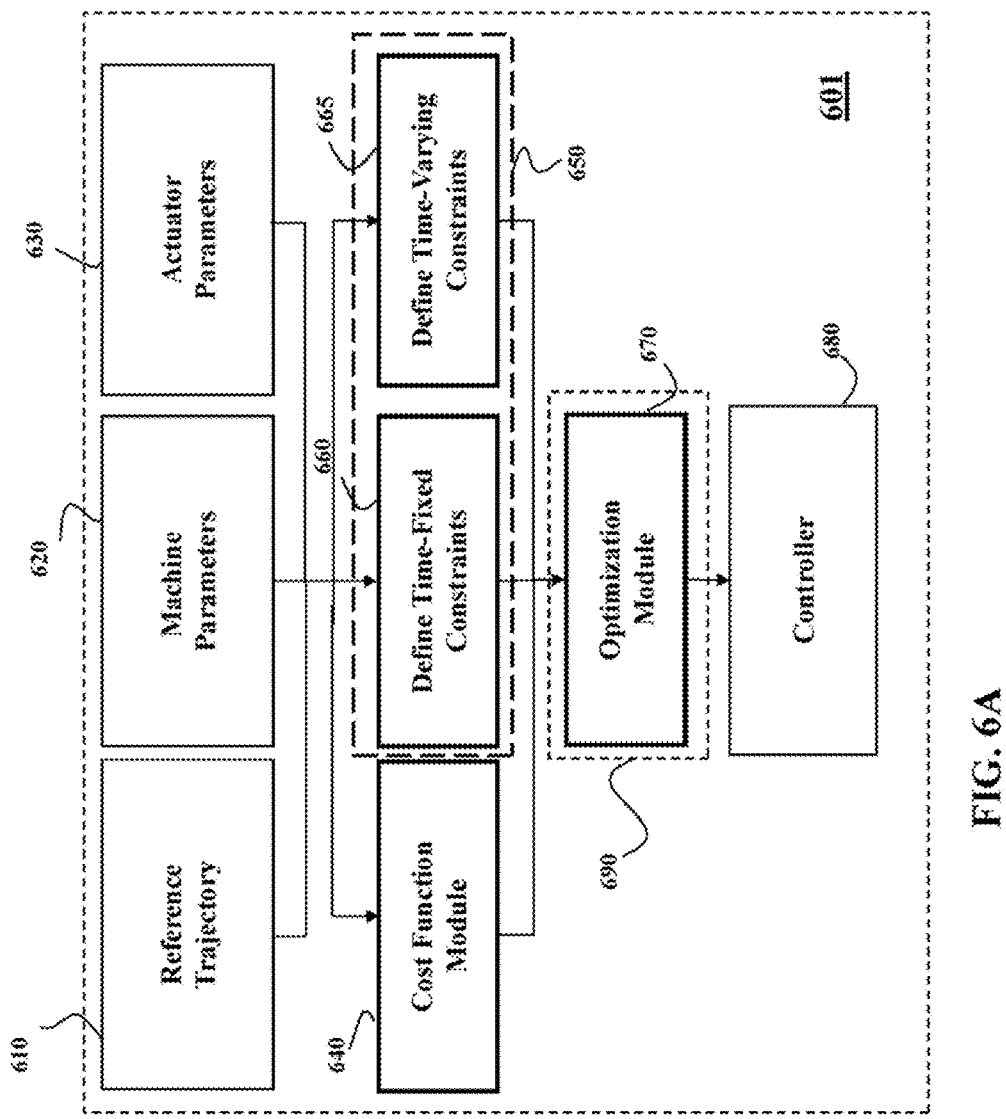
FIGS. 6A-B are block diagrams of a system and a method for coordinated control of the redundant actuators in the laser-cutting machine.
Figure 6B:
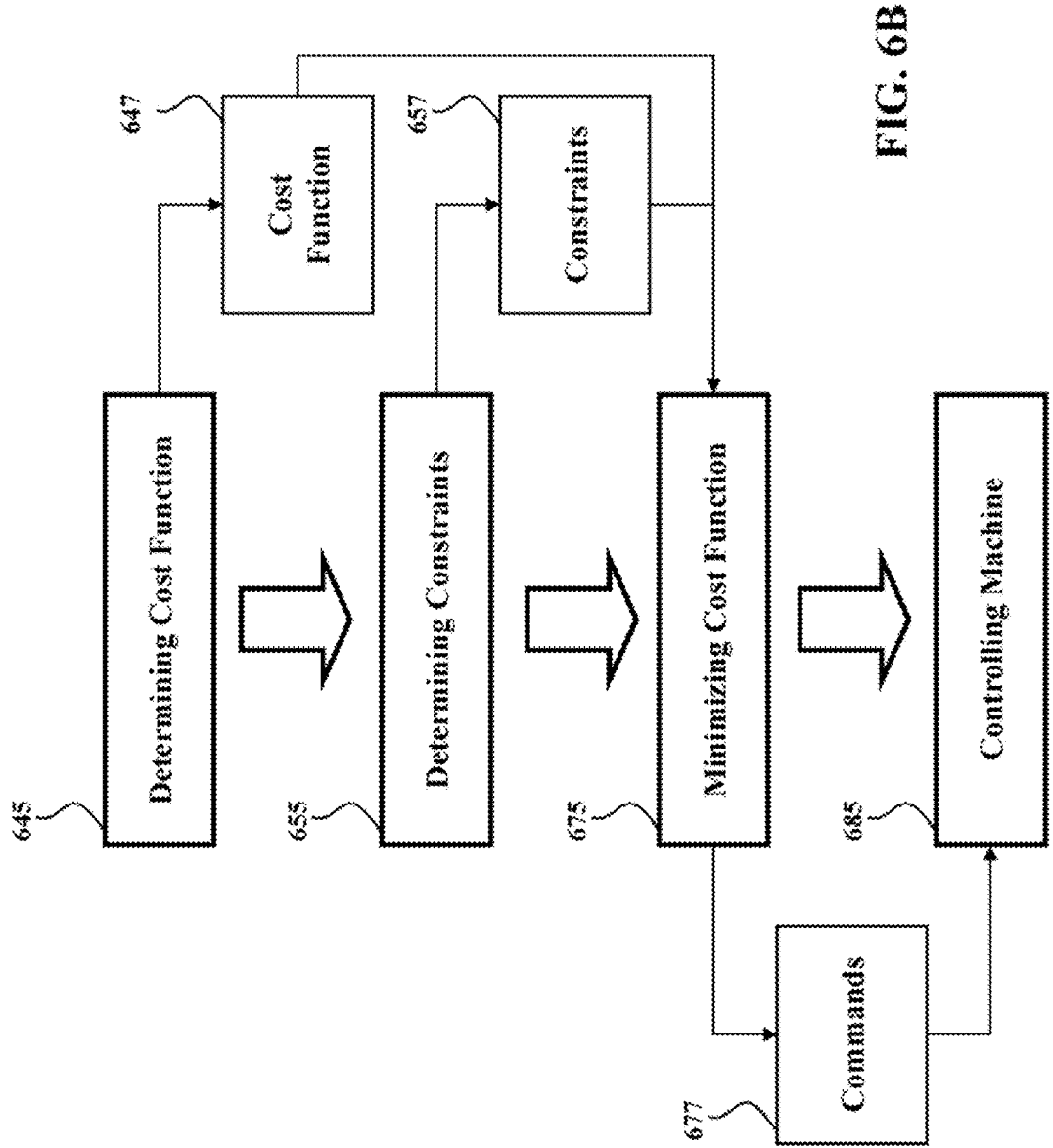

FIGS. 6A-B shows block diagrams of a system 600 and a method for controlling redundant actuators of a machine operating substantially concurrently along at least one direction, according to some embodiments of the invention. For example, the system 600 can be used to control the actuators of the laser cutting machine described above. The embodiments receives as an input a reference trajectory 610 parameters 620 that are primarily dictated by customer specifications such as cutting area, accuracy, and speed, and parameters 630 of the actuators, such as size, geometry, materials used for internal components of the actuators, as well as physical limits of the actuators, such as maximum speed, peak and running torques, range of motion.

The system 600 includes a processor 601 for executing a cost function module 640, a constraints module 650, and an optimization module 670. The cost function module determines 645 a cost function 647 representing operations of the redundant actuators. The constraints module determines 655 constraints 647 of the operation of actuators based on the reference trajectory, parameters of the machine and parameters of the redundant actuators. In various embodiments the constraints include at least one time-varying constraint representing the reference trajectory and at least one time-fixed constraint representing mechanics of the redundant actuators.

The optimization module optimizes, e.g., minimizes 675, the cost function subject to the constraints to produce a sequence of commands for each actuator forming the sequences of commands 677 for the redundant actuators. The sequence of commands can be stored in a memory 690 for future use and/or outputted to a controller 680 for controlling 685 the machine. Specifically, the controller applies the command sequences for each of the individual actuators to coordinate substantially concurrently the motion of the actuator along corresponding directions of motion.

Inputs

Figure 7A:
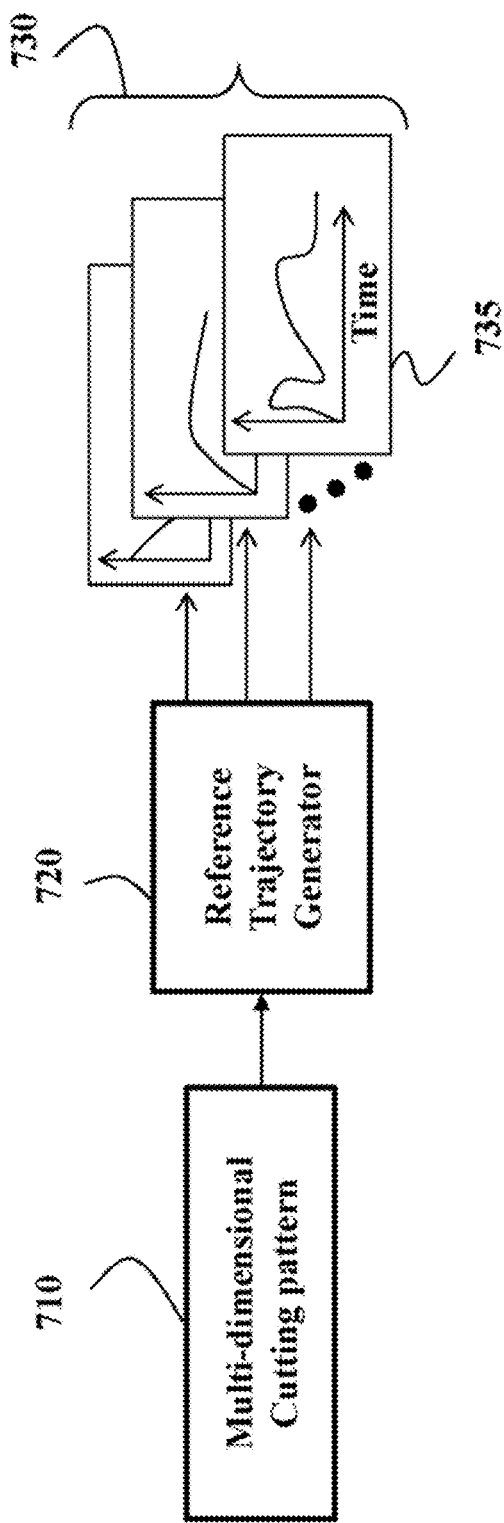
FIG. 7 is a block diagram of a reference trajectory according to an embodiment of the invention.
Figure 7:
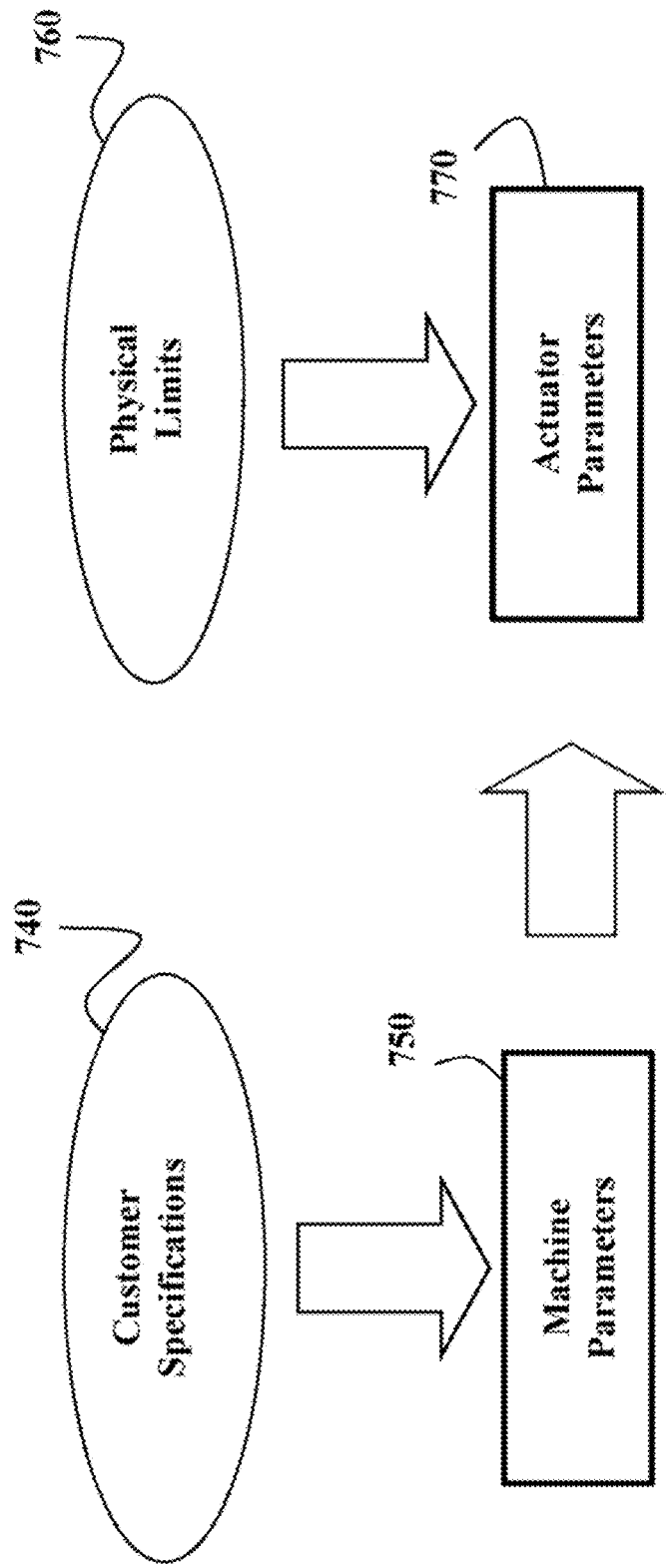

FIG. 7A shows an example of generating the reference trajectory 610 according to one embodiment of the invention. For example, the machine is a laser cutting machine that needs to cut a workpiece according to a multi-dimensional cutting pattern 710 of n dimension. One embodiment includes a reference trajectory generator 720 to produce the time profiles 730 of commands corresponding to each of those n dimensions. The time profiles 730 represent the reference trajectory. For example, if the cutting pattern is two-dimensional along X and Y directions, a time profile 735 can be an example of the reference trajectory along an X direction.

FIG. 7B shows example of other inputs used by some embodiments. These inputs include customer specifications 740, such as throughput or processing time, that are reflected in the parameters 750 selected for the machine. For example, for a laser cutting machine, a throughput specification from the customer defines the cutting area within the reach of the machine. The machine parameters 750 in turn are used to define the actuator parameters 770 used for actuators that realize a machine configuration that meets the parameters 750. For example, for a laser cutting machine the cutting area parameter arising from the throughput specification discussed above can result in a constraint on the reach of each of the actuators used in machine configurations that realize the desired cutting area. Actuator parameters 770 also represent physical limits 760 such as maximum velocity or torque that the actuators always satisfy during their operation.

Problem Illustration

Figure 8:
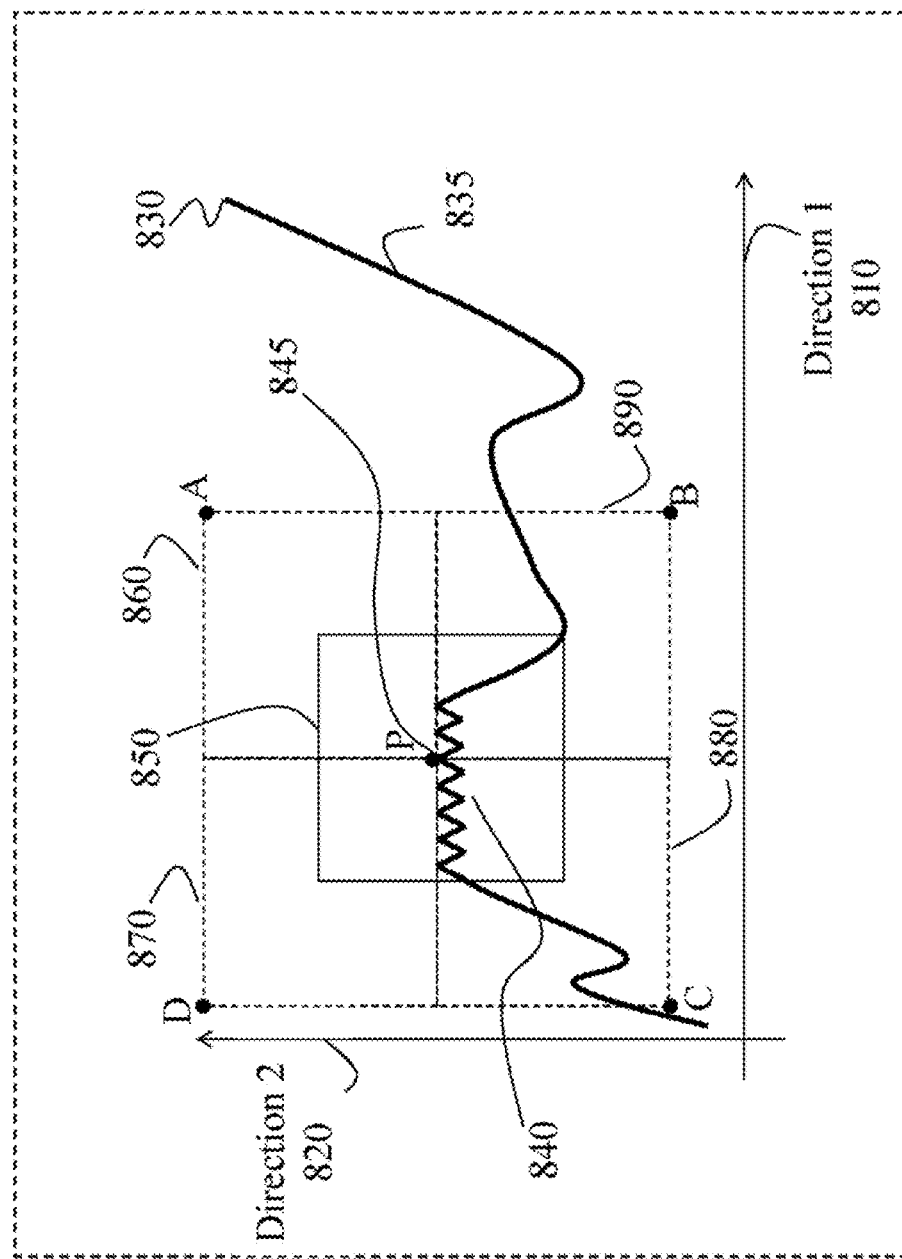
FIG. 8 is a schematic diagram of a reference trajectory used by an embodiment of the invention.

FIG. 8 illustrates the problem solved by various embodiments of the invention. In particular, a cutting pattern 800 is shown in two dimensions, i.e., n=2. A cutting path 830 is shown with low frequency components at flat portions 835 of the path, and high frequency components at portions 840 with sharp turns. At an arbitrary time instance, a laser beam 845 is located at a point P 845 on the cutting path 830.

The coordinated control problem solved by the invention is inherently difficult due to the redundancy of the actuators. For a redundant configuration involving two actuators, e.g., a slow actuator and a fast actuator, for each of the two directions, the laser beam 845 is located at the point P by a combination of displacement of the slow and fast actuators. Importantly, this combination is unknown, and also not unique.

For example, if the slow actuator positions the center of the fast actuator at point P, the range of motion of the fast actuator is indicated as the box 850. However, many other different locations of the slow actuator can position the center of the fast actuator within reach of the point P. For instance, the slow actuator can center the fast actuator in any of the squares 860, 870, 880, or 890. In the limiting case, the slow actuator can center the fast actuator at points A, B, C, or D, and the fast actuator can be actuated to their maximum displacements to position the laser beam at the point P. Determining the command sequences of the slow and fast actuator constitutes coordination of control for locating the laser beam 845 at P. The coordination determines the command sequences for every such point P on the cutting pattern, and further, ensures that in moving the actuators from one point to the other, the objectives of various embodiments of the invention, such as minimal electrical energy consumed and vibrations are reduced.

Cost Function

Figure 9:
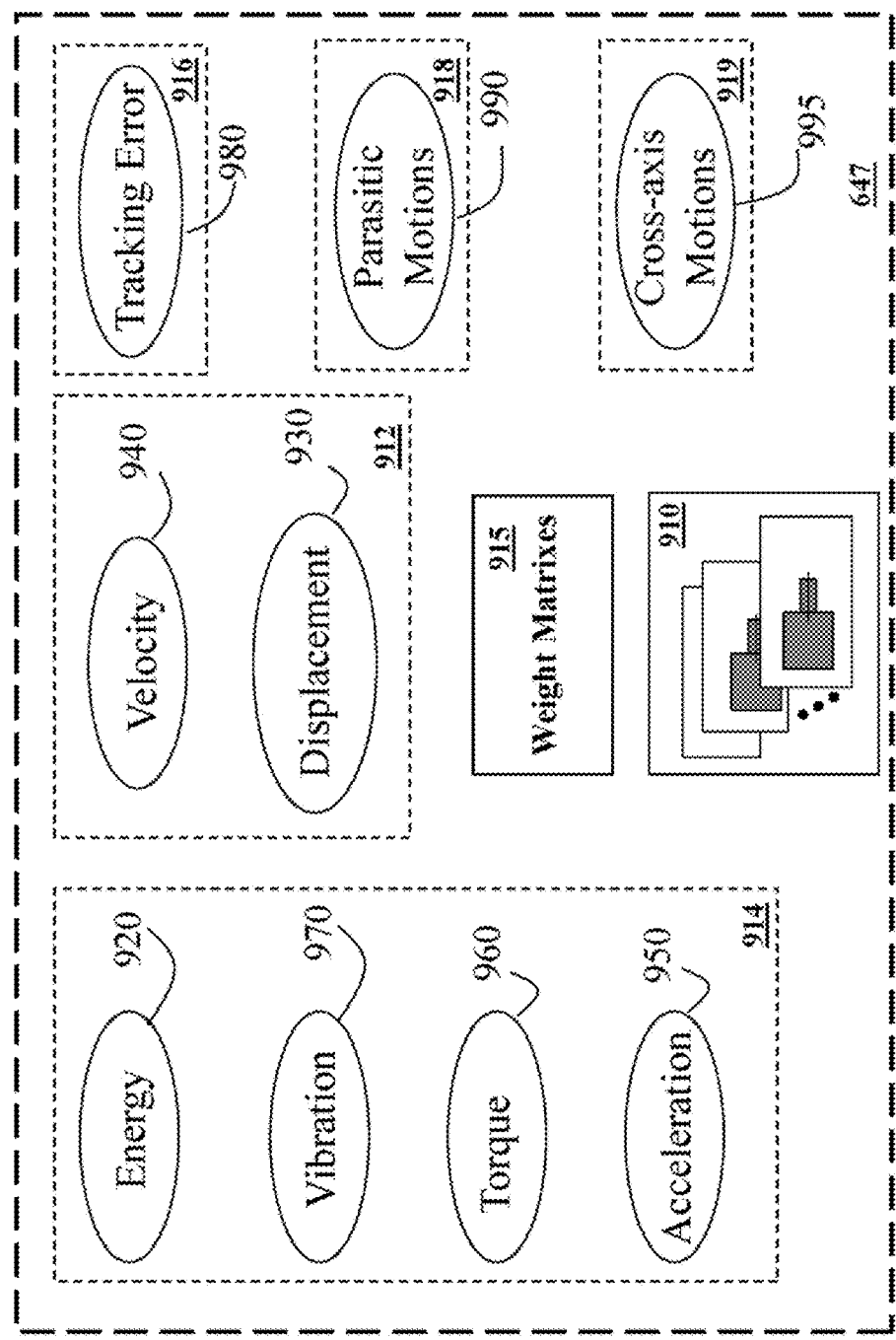
FIG. 9 is a block diagram of main components of cost function formulated in an embodiment of the invention.

FIG. 9 shows various cost functions 647 determined by various embodiments of the invention. For each actuator 910, the cost function includes components, e.g., components 912, 914, 916, 918, and 919, addressing one or combination of the objectives of the invention, such as minimizing tracking error 980, as well energy consumed 920, and vibration 970 of the machine during the operation. Minimize displacement 930 of the actuators, as well as their velocities 930, accelerations 950 and torque 960. Also, some embodiments minimize parasitic motion 990 and cross-axis motion 995 of the actuators.

Typically, each component of the cost function is a mathematical norm, such as the 1-norm, 2-norm, or infinity-norm of a desired feature of the behavior of the redundant actuators. For example, one embodiment defines the cost function for the case of n directions of motion, m number of actuators per direction, and N time samples, over which the cost function is evaluated, according to Equation (1)

$$\sum_{k=1}^{N} \sum_{j=1}^{m} \sum_{i=1}^{n} \|x_{ij}(k)\|_{p,Q} + \|u_{ij}(k)\|_{p,R} + \|e_{ij}(k)\|_{p,S} \qquad (1)$$

where $\|.\|_{p,M}$ is $p^{th}$ norm of the vector (.) weighted by matrix M for $i^{th}$ actuator in $j^{th}$ direction of motion at time instant k, where i is a number of actuator ranging from 1 to n, j is a number of directions of motion ranging from 1 to m, k is an integer value ranging from 1 to N, and x is a state of the actuator including both a displacement from a resting position and a velocity of the actuator, u is a control input to each actuator, e is a displacement of the actuator from the reference trajectory.

For example, for the case of p=2, the first component 912 of the cost function can be written as:

$$\{x_{ij}(k)\}^T Q x_{ij}(k) \qquad (2)$$

The weight matrices Q, R, S, 915 are usually positive definite. Also, weighted $p^{th}$ norm is referred herein as weighted norm, or a norm.

In the cost function of Equation (1) the first term 912 represent the state cost, which denotes a weighted norm of the state x of the actuator. The state cost can represent both position or displacement 930 and velocity 940 of the actuator. So the first term reduces to a cost representing position and velocity of the actuator.

in the cost function of Equation (1) the second component is a control cost 914, representing a weighted norm of the control inputs applied to the actuator. For servomotors, this represents a torque. Given a known inertia of the load, the acceleration of the moving inertia can be obtained by normalizing the torque with the moment of inertia of the rotating mass after reflecting the torque over any transmission systems, such as belt drive or gear reduction, used in the specific implementation of the actuator. Thus, the second component represents a cost of torque 960 or acceleration 950 resulting from using the actuators. A 2-norm of the control torque can also be shown to directly be proportional to the $I^2R$ losses of the motor, thus representing the electrical energy 920 consumed by the actuator.

Further, because this embodiment minimizes the control torques applied, implicitly, any abrupt changes in the curvature of the path are also minimized. For the case of a machine provided with slow and fast actuators, this results in minimizing high frequency components of the actuator commands for the slow actuator. Thus machine vibrations 970 in the slow actuator are reduced, thereby wear and tear are minimized.

In the cost function of Equation (1), we refer to the third tracking error component 916 as a norm of the tracking error 980 of the actuator defined as the difference between the actuator position and the given reference trajectory at that time sample.

As an example of the above cost function, for the specific case of a laser cutting machine that tracks reference trajectories in the two-dimensional XY plane, while using a set of redundant short-stroke fast axes along with long-stroke slow axes, one embodiment using two norms for each of the terms in Eq. (1) is shown below:

$$\sum_{k=1}^{N}\sum_{j=1}^{2}\sum_{i=1}^{2}\{x_{ij}(k)\}^T Q x_{ij}(k) + \{u_{ij}(k)\}^T P u_{ij}(k) + \{e_{ij}(k)\}^T S e_{ij}(k)_i. \quad (3)$$

where we use the 2-norm for each of the terms of Eq. (1). Here the directions of motion are X and Y, and hence the number of directions of motion is m=2. Further, since a set of slow and fast axes are used for each direction, the total number of actuators per direction is n=2. In one case, we can select each of Q, P, or S as diagonal matrices with positive numbers along the diagonal to make them positive definite. For example, we can select Q, P, and S as follows:

$$Q = \begin{bmatrix} q_1 & 0 \\ 0 & q_2 \end{bmatrix}, \quad (4)$$

$$P = \begin{bmatrix} p_1 & 0 \\ 0 & p_2 \end{bmatrix},$$

$$S = \begin{bmatrix} s_1 & 0 \\ 0 & s_2 \end{bmatrix},$$

where all elements of the above matrices are positive. Also, the values of the elements relative to each other within any given matrix is important. For example, if $q_1=100\ q_2$, the cost function penalizes displacement more than velocity in each of the states of the slow and fast axes. Further if $q_1=100\ q_2$ and $p_1=p_2=q_2/100$, the control inputs of the axes are penalized all the same, but much smaller than the states of the actuators. Thus the weights in the cost function are tuning knobs for the end-users, providing them with a variety of combinations of objectives to be achieved with the coordinated control of the redundant actuators.

In some embodiments, two more components 918 and 919 representing norms of feedforward terms added to the control torque to minimize undesirable motions executed by the actuators. Specifically, each of the terms represents one of two possible undesired motions: parasitic motions 918, which are residual motions along directions of the motion of the actuator that are excited by the input to the actuator in addition to the main motions along the predominant direction, and cross-axis motions 995, which are residual motions of the actuator excited by inputs applied to other actuators.

For example, two more terms that can be added to the cost function of Eq. (1), to represent the terms 918 and 919:

$$\|v_{ij}(k)\|_p, T_1 + \|w_{ij}(k)\|_p, T_2 \quad (5)$$

where $T_1$, $T_2$ are positive definite weight matrices, v is a feedforward control input for minimizing error motions in undesirable directions resulting from an input to the actuator, and w is a feedforward component for minimizing a parasitic motion resulting from a cross-axis coupling between the redundant actuators.

Many variations of the cost function are possible and are construed as falling under the spirit of the embodiments of the invention. For example, the number of actuators can be different in different directions of motion. The weight matrices can be different in different terms of the cost function. Further, the weight matrices can also be frequency-dependent by considering the cost function from a frequency domain representation. In that case, explicitly components of motion corresponding to a particular frequency can be minimized. For example, another term can be added to the cost function of Eq. (1) as follows:

$$\sum_{j=1}^{m}\sum_{i=1}^{n}\int_{-\pi}^{\pi}\{X_{ij}(\omega)^T W_1(\omega) X_{ij}(\omega) + U_{ij}(\omega)^T W_2(\omega) U_{ij}(\omega) + E_{ij}(\omega)^T W_3(\omega) E_{ij}(\omega)\} d\omega$$

where ω is the frequency variable, X, U, E are the discrete-time fourier transforms of the signals x, u, and e, respectively, the weighting matrices $W_1, W_2, W_3$ are frequency dependent, and can be selected as a notch or a bandstop filter, thereby penalizing the command sequences derived from the embodiment to be small at select frequencies.

Constraints

Figure 10:
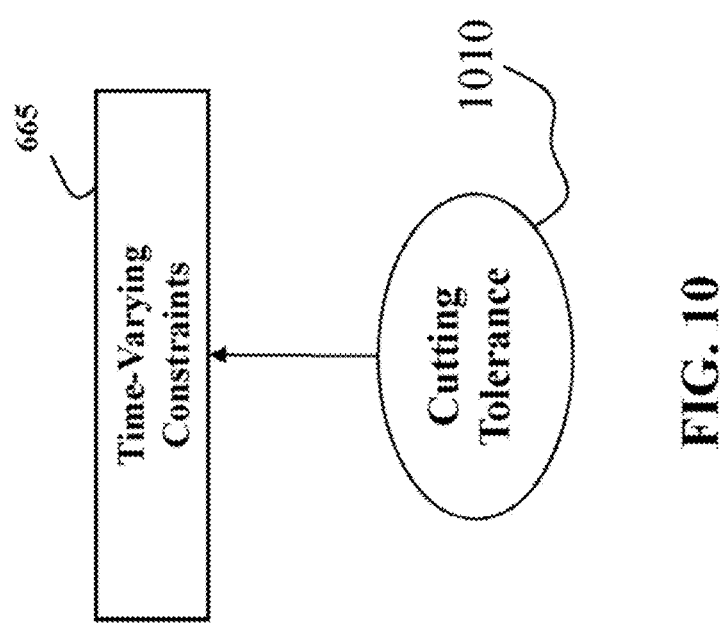
FIG. 10 is a block diagram of main components of time-varying constraints according to embodiment of the invention.

Some embodiments of the invention utilized two types of constraints, i.e., the time-varying constraint representing the reference trajectory and the time-fixed constraint representing the redundant actuators, e.g., physical limits of the redundant actuators and the machine. FIG. 10 shows an example of determining the time varying constraint 665. The time-varying constraint applies time varying limits on the dynamic behavior of the actuator imposing the cutting accuracy of the specification. One embodiment uses the time-varying constraint as $$r(k) = \sum_{j=1}^{m}\sum_{i=1}^{n} y_{ij}(k), \quad (6)$$

where r(k) is the reference trajectory sampled at the time instant k, and the position estimate of the laser beam resulting from coordinated motions of the $i^{th}$ actuator used for motion along the $j^{th}$ direction is $y_{ij}(k)$, where $i=1, 2, 3, \ldots, n$, $j=1, 2, 3, \ldots, m$.

The position estimate can be generated from a model of the system or from physical measurements (such as those obtained in real-time from encoders, position sensing photodiodes, or other measuring instruments), or a combination of both models and measurements. The significance of this constraint is that at every time instant, the laser cutter is constrained to move such that the laser beam follows the given reference trajectory. Otherwise, tracking performance can be seriously compromised in many different failure modes, manifest as unbounded increase in magnitude of tracking errors, saturation of actuators, or actuation of sudden braking mechanisms from triggering of limit switches placed for safety of the laser-cutting machine.

In another embodiment of the invention, the cutting accuracy constraint is relaxed according to tolerances ε 1010. The tolerance allows for the actuators to be less accurate in their tracking performance, thereby leading to extra savings of energy. According to this embodiment, the time-varying constraint is $$\left| r(k) - \sum_{j=1}^{m} \sum_{i=1}^{n} y_{ij}(k) \right| < \epsilon, \tag{7}$$

where |•| denotes the absolute value of quantity •.

In some cases, when the laser beam does not follow the reference trajectory, the error motions may accumulate resulting in mechanical collisions of the actuators, which can lead to catastrophic failure of the machine and impose safety hazards to the operator(s). In some machines, physical limits are imposed on actuator motion with limit switches. In the absence of position constraints, a straying actuator can trigger one of the limit switches, which, in turn, can result in an automatic shutdown of the machine. For a machine in operation, and moving at high speeds, sudden braking from hitting limit switches is highly undesirable because the high momentum of the work piece can result in it posing a safety hazard to operator(s) and also damage the machine or its several components.

Figure 11:
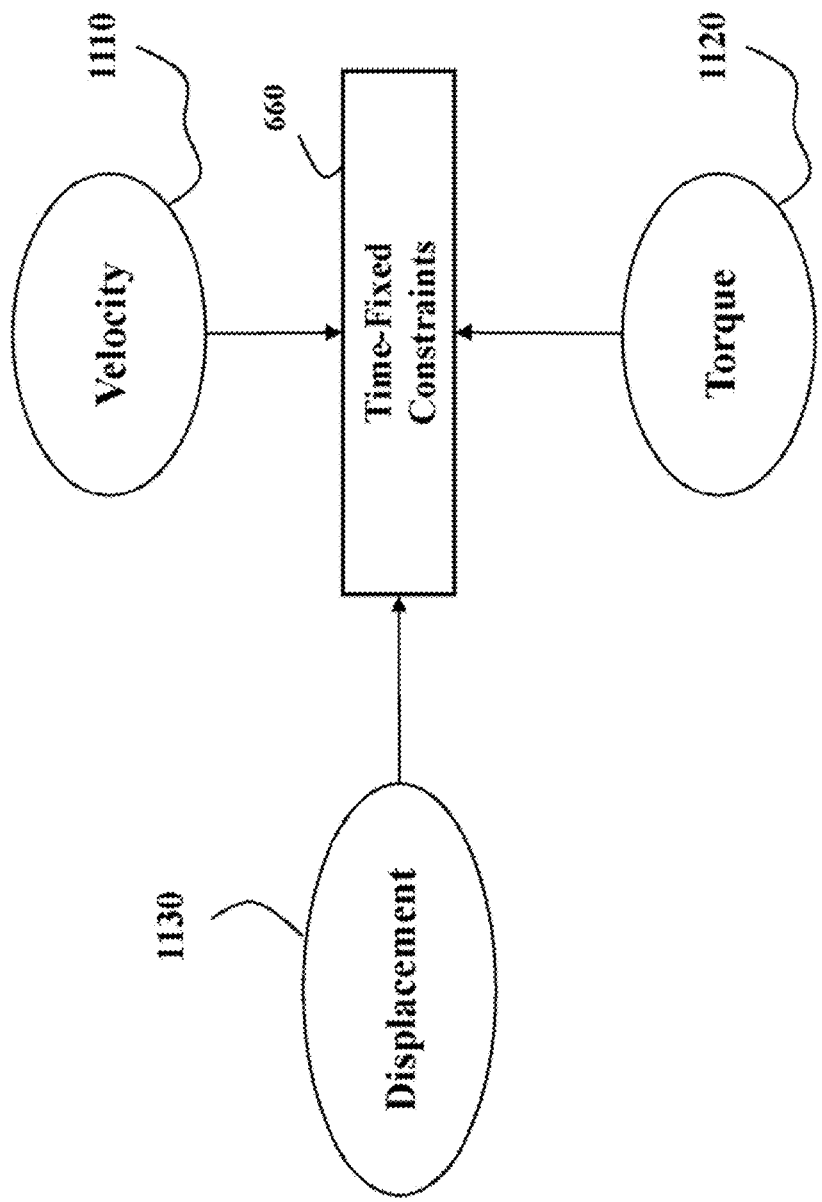
FIG. 11 is a block diagram showing main components of time-fixed constraints according to embodiment of the invention.

FIG. 11 illustrates the time-fixed constraints 660 that impose fixed physical limits of the machine. In some embodiments, the time-fixed constraints are specified in one or combination of the position or displacement 1130, the velocity 1110, and the control torque 1120 of $i^{th}$ actuator used for motion along the $j^{th}$ direction is denoted as $y_{ij}(k)$, where $i=1, 2, 3, \ldots, n$, $j=1, 2, 3, \ldots, m$, according to $$|y_{ij}(k)| < P_{max,ij} \tag{8}$$

$$|v_{ij}(k)| < v_{max,ij} \tag{9}$$

$$|u_{ij}(k)| < u_{max,ij}, \tag{10}$$

where the limits on the right hand side of the above inequalities denote, respectively, the absolute maximum position, velocity, and control limit of each actuator. In some embodiments, the maximum limit is not the same in forward motion and reverse motion of the actuator. The constraint inequalities can be modified to include a minimum limit different from the maximum limit on the magnitude of the position, velocity, and control values for each actuator in such cases.

Figure 12:
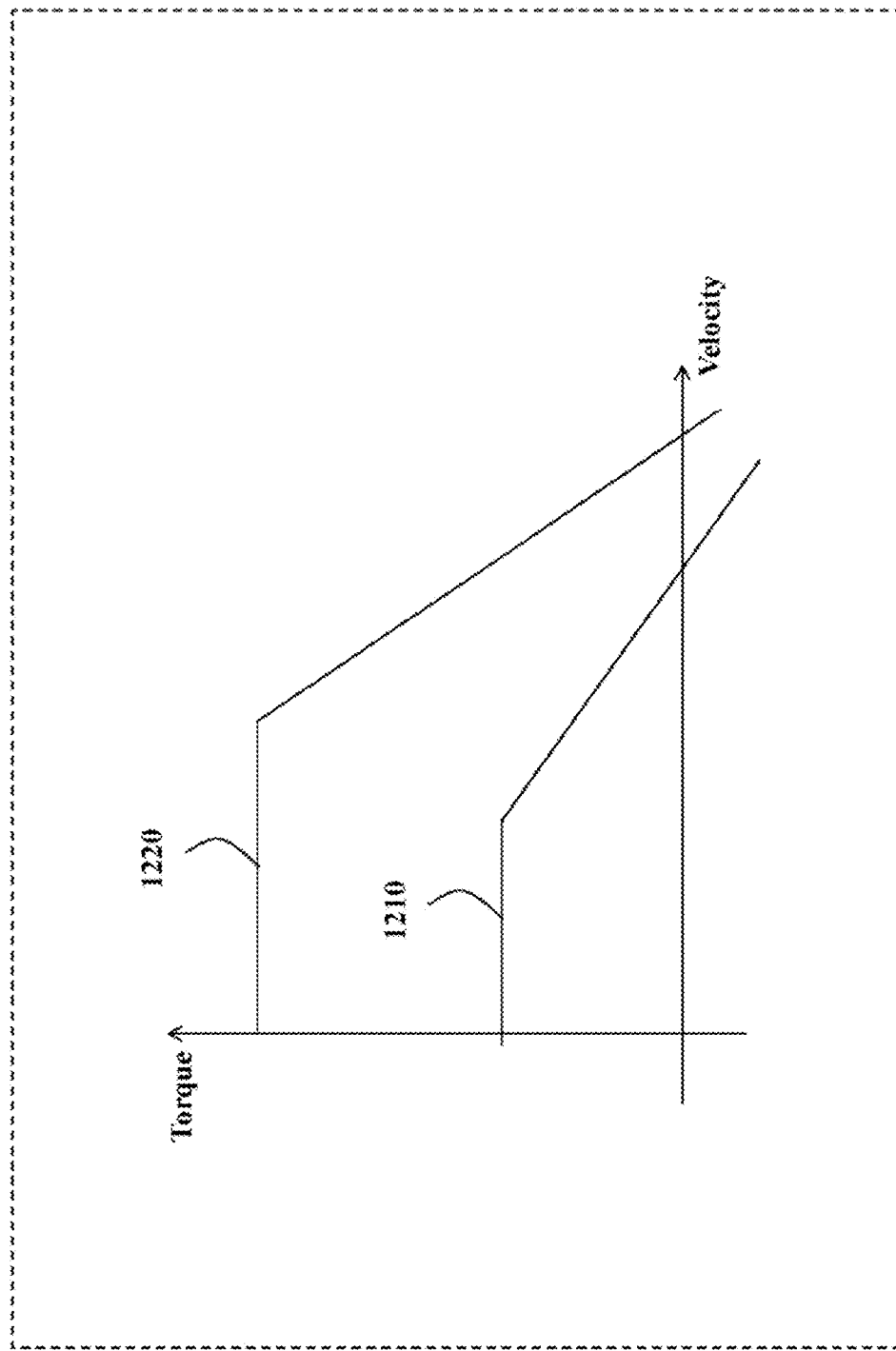
FIG. 12 are graphs of torque constraints as a function of velocity according to an embodiment of the invention.

As shown in FIG. 12, for typical motors the maximum values of torque, both the continuous running torque 1210 and the instantaneous peak torque 1220, have a roll-off characteristic that arises from limitations of power generated for the motion. In some embodiments of the invention, the linear inequalities of Equations (5-7) are modified to include such torque-speed characteristic relations.

As an example of the above constraints, for the specific case of a laser cutting machine that allows for a laser spot to be tracked along reference trajectories in the two-dimensional XY plane, while using a set of redundant short-stroke fast axes along with long-stroke slow axes, one embodiment representation of the constraints of Eq. (7) are as follows:

$$\left| r(k) - \sum_{j=1}^{2} \sum_{i=1}^{2} y_{ij}(k) \right| < \epsilon \tag{11}$$

resulting in a specific case of Eq. (7), where, since the directions of motion are X (corresponding to i=1) and Y,X (corresponding to i=2), the number of directions of motion is m=2, and since a set of slow (corresponding to j=1) and fast (corresponding to j=2) axes are used for each direction, the total number of actuators per direction is n=2. For a range of motion of $X_{s,max}$ in the X direction and $y_{s,max}$ in the Y direction, maximum torque of $u_{s,max}$, and maximum rpm of $r_{max}$ for the slow axes, a pitch $L_s$ for the transmission screw used for the servomotors; and a range of motion $x_{f,max}$ in the X direction and $y_{f,max}$ in the Y direction, maximum torque of $u_{f,max}$, and maximum rpm of $r_{f,max}$ for the slow axes, a focal length f for a scanning lens for the galvano-driven fast axes, the constraints of Eqs. (8)-(10) are as follows:

$$|y_{11}(k)| < X_{s,max} \tag{12}$$

$$|y_{12}(k)| < x_{f,max} \tag{13}$$

$$|y_{21}(k)| < y_{s,max} \tag{14}$$

$$|y_{22}(k)| < y_{f,max} \tag{15}$$

$$|v_{11}(k)| < Lr_{s,max} \tag{15}$$

$$|v_{12}(k)| < fr_{f,max} \tag{17}$$

$$|v_{21}(k)| < Lr_{s,max} \tag{18}$$

$$|v_{22}(k)| < fr_{f,max} \tag{19}$$

$$|u_{11}(k)| < u_{s,max} \tag{20}$$

$$|u_{12}(k)| < u_{f,max} \tag{21}$$

$$|u_{21}(k)| < u_{s,max} \tag{22}$$

$$|u_{22}(k)| < u_{f,max} \tag{23}$$

Minimizing Cost Function

In various embodiments, the cost function is minimized for N time samples that can be selected in many ways. If the reference trajectory is known, then the time samples can be selected for the entire reference trajectory. Alternatively, in some situations, the reference trajectory is not fully known a priori, i.e., only a few samples ahead of the current time sample are known. In that case, the number of samples can be limited to the number of reference samples known ahead. Because the minimization is performed over a set number of future samples, the minimization is performed over a future horizon or window, which is finite. In some embodiments of the invention, a size of the window is at least the time constant of the slowest actuator of the machine.

In some embodiments of the invention, the minimization problem for the fully known reference trajectory is, i.e., over an infinite horizon, can still be solved using multiple finite smaller windows fused over time. These embodiments partition the infinite horizon problem into smaller horizons. This is desirable to reduce the computational complexity of solvers used for the minimization problem. In using the finite horizons, a terminal cost function and hard equality or inequality (set) constraints can be added to each window minimization problem to ensure that the reference trajectory can be tracked without violating constraints as the minimization proceeds from one window to the next.

In one embodiment of the invention, a model of the laser-cutting machine is provided over the future horizon of N samples to predict the response of the system to a set of control inputs. This model is used to determine the cost function. In some embodiments, the model is derived from the underlying physics of the laser-cutting machine, such as those based on lumped parameter approximations or finite element approximations. In some embodiments, the models are empirically derived from system identification experiments performed on the machine.

In one embodiment of the invention, the cost function selected as a 2-norm or Euclidean norm for the minimization problem. The resulting minimization problem becomes a convex quadratic programming problem, which can be reduced to a form involving only control variables. We refer to the minimization problem involved in generating the command sequences as a constrained minimization problem or convex quadratic programming problem, or simply quadratic programming problems. There are many ways of solving convex quadratic programming problems, including fast quadratic programming solvers based on methods including, but not limited to, interior point methods and active-set methods.

Figure 13:
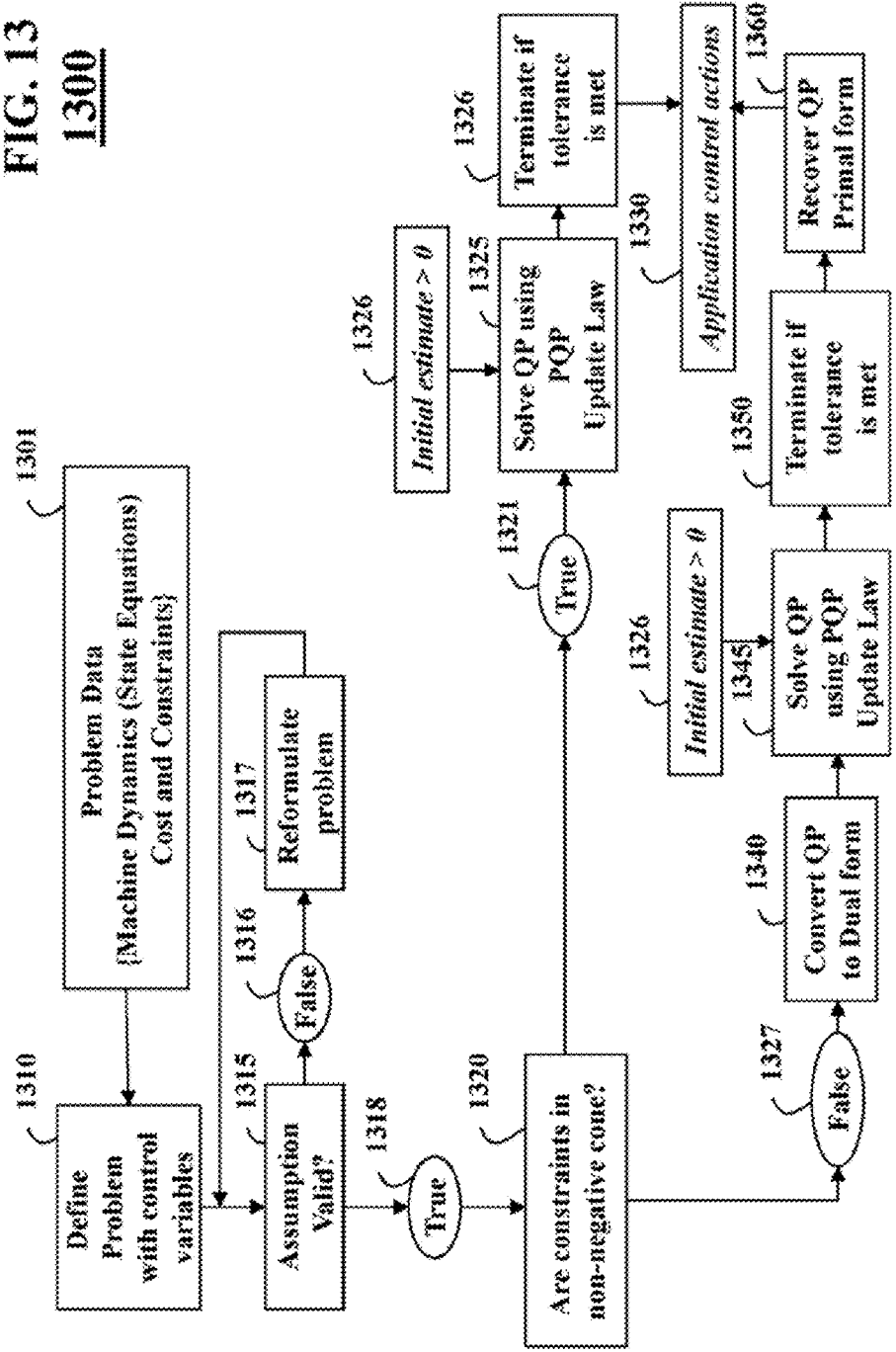
FIG. 13 is a block diagram of a method for solving the underlying constrained minimization problem according to an embodiment of the invention.

FIG. 13 shows a block diagram of a method for solving an optimization-based control problem suitable for minimizing the cost function 647. Input 1301 to the method includes control parameters and variables, dynamic state equations, costs, and constraints. The parameters can include machine parameters such as masses, lengths and material parameters. The constraints can include maximum velocity, range of travel, and maximum torque. An optimization problem is defined 1310 for the application using dynamic models and the input. As known by those of ordinary skill in the art, the model can be obtained from physics-based models, or black-box models.

The optimization problem is solved for each finite time interval of a set of N samples. A cost function is predetermined or user defined for the specific application. The constraints are also dictated by the application. As described below, the optimization problem can be set up as quadratic programming (QP) problem in terms of control variables.

The QP problem is tested 1315 for validity of an assumption, on positive definiteness of the quadratic term used in the QP. If the assumption is not valid 1316, the QP is reformulated 1317 until the assumption is valid.

If the assumption is valid 1318, then there is an additional condition to be tested 1320 for the constraints of the problem. If the constraints are in a non-negative cone 1321, the QP is solved 1325 by using a PQP update law with a positive initial estimate 1326 until a termination condition 1326 is met. Many choices exist for the termination condition, for example, a tolerance on cost function or on primal variables, or on changes in their values. The control actions obtained from the optimization are then applied 1330 to the application, e.g., machine, plant, and the like.

If the constrains are not in the non-negative cone 1327, then the primal QP is converted 1340 to a dual form, and the PQP update law is applied 1345 for a positive initial estimate until a termination condition is met 1350. The original primal problem is then recovered 160 from the dual form and the corresponding control actions are then applied to the application.

The method of FIG. 13 solves the quadratic programming problem by first converting the problem into dual according to:

$$\min_y \left\{ F(y) = \frac{1}{2} y^T Q y + y^T h \right\}_i \quad (24)$$
$$s.t. \ y \geq 0$$

where y is the dual variable vector, and Q>0 is a fixed Hessian matrix that depends on the fixed constraints, the system parameters, and user-defined weights in the cost function. This dual form can be solved using a parallelizable iterative update law $$y_i \leftarrow y_i \left[ \frac{h_i^- + (Q^- y)_i}{h_i^+ + (Q^+ y)_i} \right] \quad (25)$$

Controlling the Operation of the Actuators

In various embodiments of the invention, the sequences of commands required for coordinating motions of the redundant actuators are determined by solving the minimization of cost function of Equation (1) subject to constraints of Equations (3)-(7) using, e.g., a quadratic programming problem formulation and fast quadratic programming solvers. There are many possible ways for applying the command sequences. After the minimization is performed and the control variables are solved, a model of the system can be used to generate command sequences for each of the individual actuators, or axes of motion.

Figure 14:
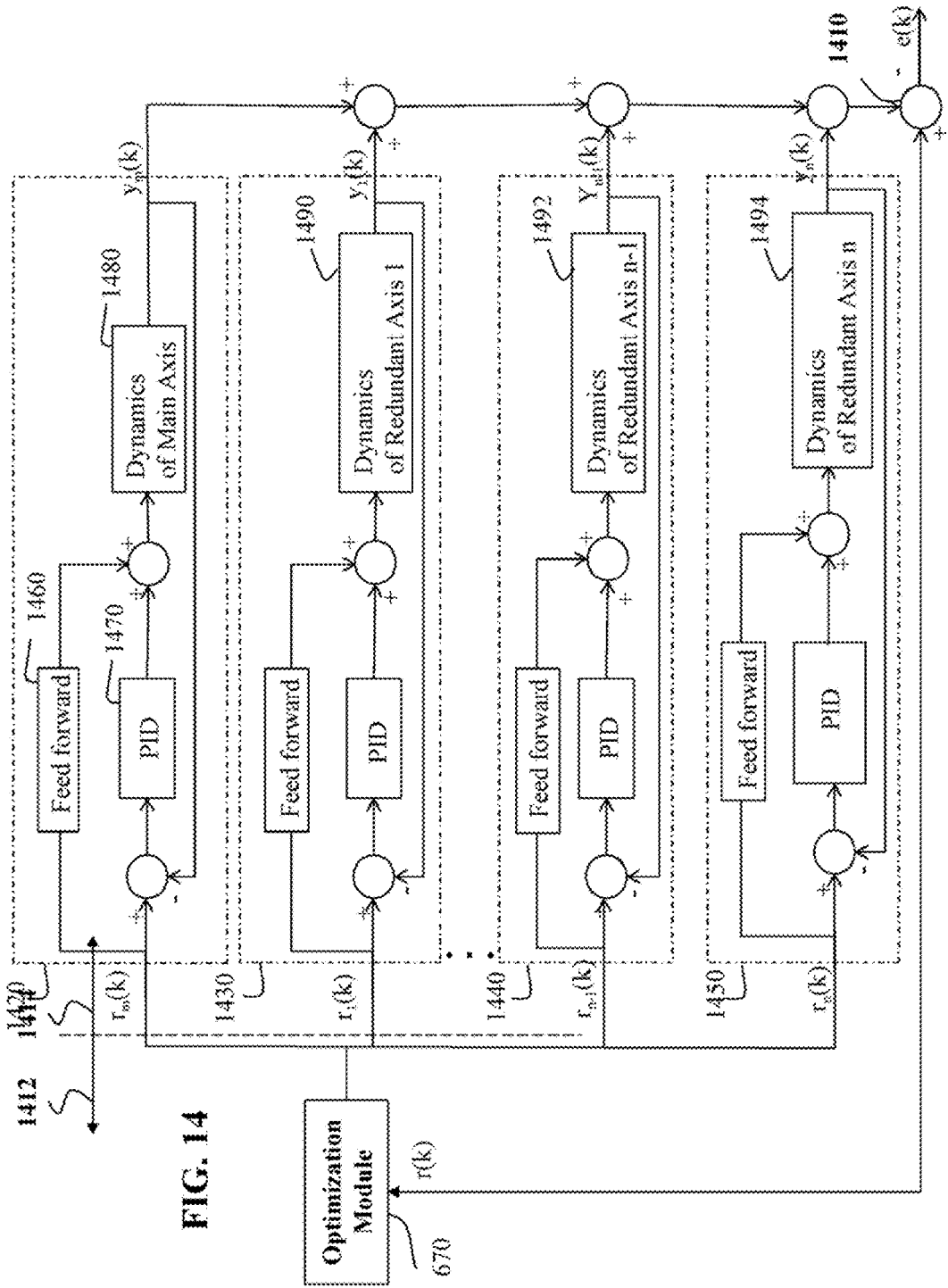
FIGS. 14-16 are block diagrams of various control architectures for controlling individual actuators according to various embodiments of the invention.

FIG. 14 shows an example of the controller 680 controlling the redundant actuators based on the command sequences $r_m(k)$ for the main actuator 1480, the command sequences $r_1(k)$ for first redundant actuator 1490, the command sequences $r_2(k)$ for second redundant actuator, and so on until the command sequences $r_n(k)$ for the n-th redundant actuator 1494. While the sequences of commands can be generated offline 1412, the commands are followed using an online 1414 implementation through control modules. For example, a control module 1420 is used to control operation of the main actuator 1480, a control module 1430 is used to control operation of the actuator 1490, a control module 1440 is used to control operation of the actuator 1492, and a control module 1450 is used to control operation of the actuator 1494. Each control module, such as 1420, can include a feedback-based control block such as a proportional-integral-derivative controller (PID) 1470, and a feed-forward based control block 1460 that are input to the dynamics of the respective actuators.

Many rapid controller platforms are available to run such controllers online. These include both digital signal processing (DSP) and field-programmable gate array (FPGA) based implementations in which the controller parameters can be tuned for improving tracking performance. In one embodiment the tracking error e(k) 1410 is the difference between the given reference trajectory and the sum of the outputs of the individual actuators indicated as $y_m(k)$ for the main actuator, and $y_1(k)$, $y_2(k)$ and so on until $y_n(k)$ for the redundant actuators.

The control modules 1420, 1430, 1440, and 1450 can be implemented using many feed-back based and/or feedforward based controllers. These include, and are not limited to, feedback controllers such classical lead, lag, lead-lag or proportional, proportional derivative, proportional integral, optimal controllers synthesized based on linear quadratic Guassian control, $H_2$ or $H_\infty$ loop shaping and optimization, feedforward controllers such as those based on pre-filtering and model-inversion, and two degree-of-freedom mixed sensitivity synthesis.

The control modules 1420, 1430, 1440, and 1450 are decoupled from each other. However, some embodiments also include feedforward blocks and control signals that allow for compensation of any interactions between the different actuators.

Figure 15:
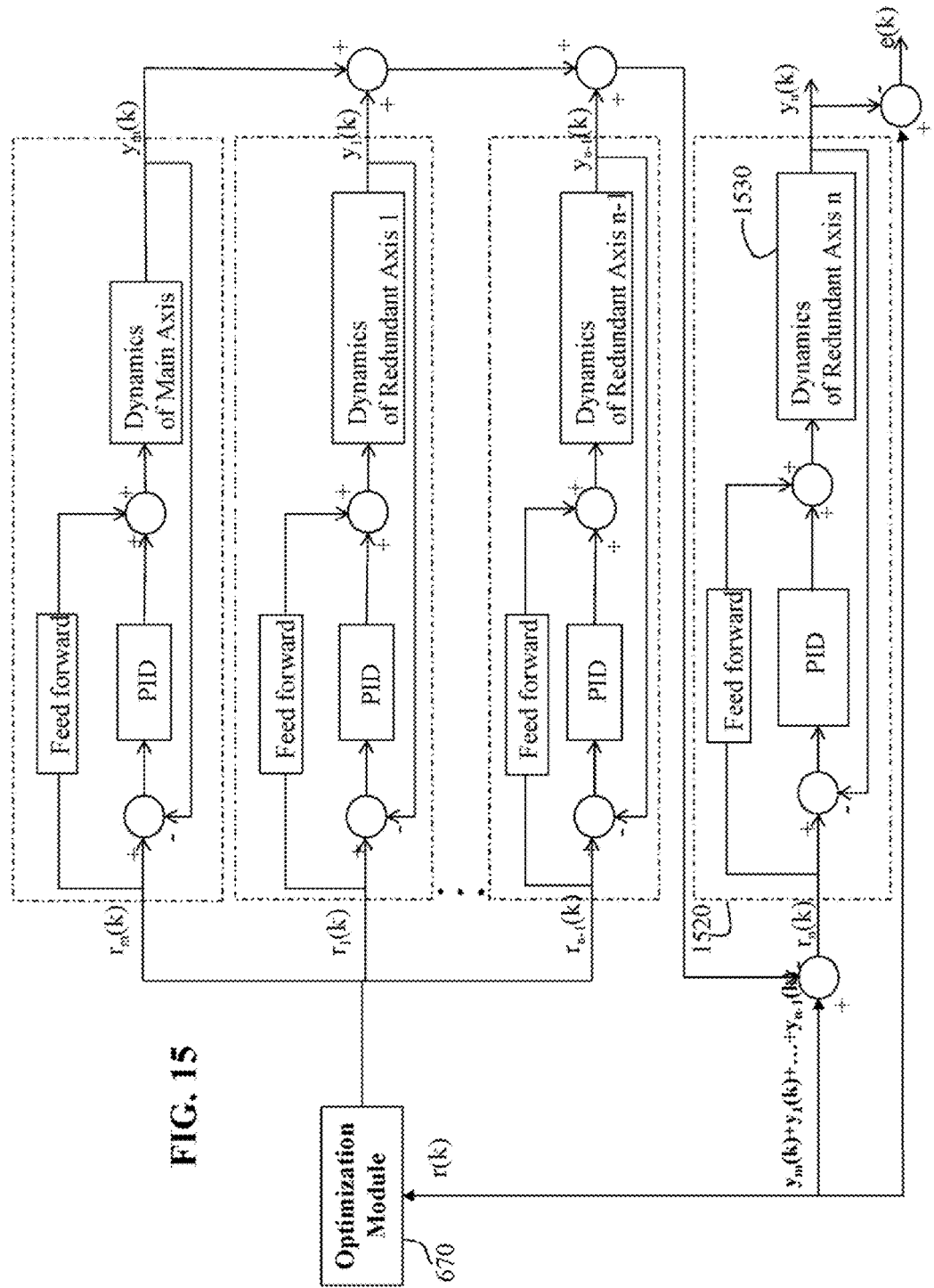

FIG. 15 shows another embodiment of the controller 680, in which the control module 1520 used for the last redundant actuator 1530 is driven with a command that may be different from the command sequence obtained from the optimization module 670. The command applied to control module 1520 is determined by calculating the difference between the current sample of the reference trajectory and the sum of the outputs of other redundant actuators.

Figure 16:
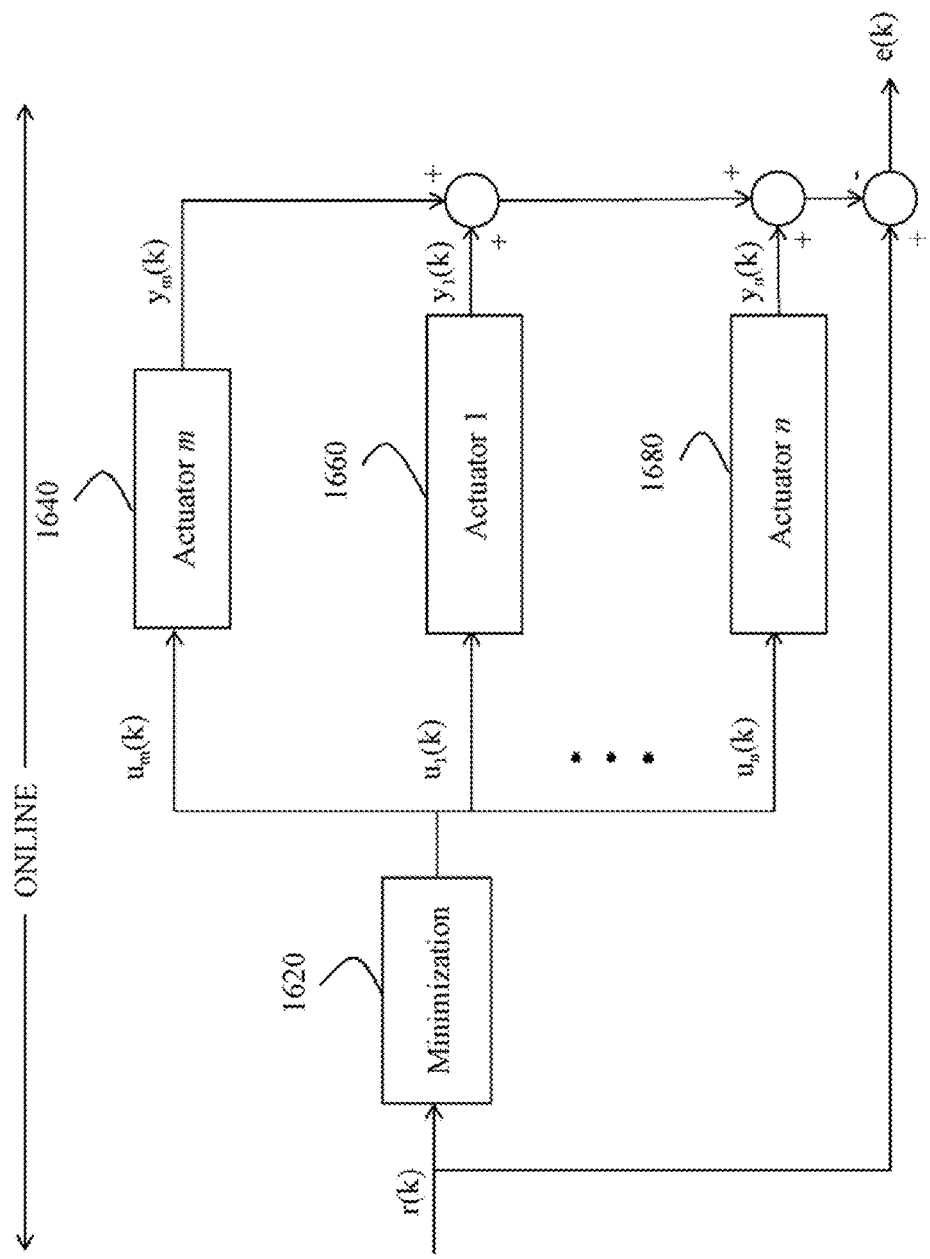

FIG. 16 shows yet another example of the controller wherein the minimization 1620 of the cost function is performed online using a fast quadratic programming solver such as the parallel quadratic programming solver discussed above. Other embodiments include explicit mapping of the control as an affine function of state space and the given reference trajectory. The command sequences include controls torques or forces that are directly applied to the corresponding axes of motion. The solver can be tuned online for the different weights in the cost function and the constraint, and the tracking performance measured in terms of the error $e(k)$ can also be timed online.

Effect of the Invention

Embodiments of the invention result in increasing a productivity of a laser-cutting machine. Specifically, the combination of the galvano assembly arranged on a movable platform in a fixed position allows for cutting large parts of a workpiece with fine details, avoids mechanical crashes of the components of the laser cutting machine, simplifies the controlling of the machine, and increases a speed of the operation of the laser cutting machine.

Some embodiments of the invention also result in coordinated control between the large range slow servomotor-driven actuator and the short-range galvano actuator. Specifically, an optimal combination of commands is generated such that the electrical energy consumed and machine vibrations are minimized, while always respecting the constraint imposed by the command pattern that the laser beam has to track without hitting position, velocity, and torque limits of individual actuators. The embodiments of the invention allow for both offline and real-time implementations, thus making them suitable for a wide range of factory automation, energy, control, and robotics applications where multiple actuators are integrated in the system to achieve more benefits than possible when single actuators are used.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A method for controlling redundant actuators based on a reference trajectory, comprising steps of:
   determining a cost function representing operations of the redundant actuators over an interval of time;
   minimizing the cost function, subject to constraints, to produce a sequence of commands for each actuator, wherein the constraints include at least one time-varying constraint representing the reference trajectory over the interval of time and at least one time-fixed constraint representing mechanics of the redundant actuators, wherein the time-fixed constraint includes one or combination of inequality constraints on a range of motion, a velocity, an acceleration, and a torque of each actuator;
   controlling the redundant actuators according to the sequences of commands, wherein the steps of the method are performed by a processor, and
   wherein the redundant actuators are part of a laser cutting machine and the reference trajectory represents a cutting path of a laser beam, such that the controlling positions the laser beam along the cutting path.

2. The method of claim 1, wherein the laser cutting machine includes a galvano assembly arranged on a platform, such that a motion of the platform along a first direction and along a second direction causes a motion of the galvano assembly along the first and the second directions, wherein an operation the galvano assembly directs the laser beam along a third direction, and along a fourth direction, and wherein mutual orientation of the first direction, the second direction, the third direction and the fourth direction is permanently fixed during an operation of the machine.

3. The method of claim 1,
   wherein the time-varying constraint includes an equality constraint or an inequality constraint on a sum of position contributions resulting from operations of each actuator.

4. The method of claim 1, wherein, for each actuator, the cost function includes one or a combination of a state cost component for optimizing a displacement and a velocity of the actuator, a control cost component for optimizing a torque, an acceleration, an energy consumption and a vibration of the actuator, a tracking error component for optimizing a tracking error of the actuator.

5. The method of claim 4, wherein, for each actuator, the cost function further includes components optimizing parasitic and cross-axis motions of the redundant actuators.

6. The method of claim 5, wherein the components are defined by quadratic functions.

7. The method of claim 5, wherein the cost function is according to, $$\sum_{k=1}^{N} \sum_{j=1}^{m} \sum_{i=1}^{n} \|x_{ij}(k)\|_{p,Q} + \|u_{ij}(k)\|_{p,R} + \|e_{ij}(k)\|pS$$

where $\|.\|_{p,M}$ is $p^{th}$ norm of the vector (.) weighted by matrix M for $i^{th}$ actuator in $j^{th}$ direction of motion at time instant k, where i is a number of actuator ranging from 1 to n, j is a number of directions of motion ranging from 1 to m, k is an integer value ranging from 1 to N, and x is a state of the actuator including both a displacement from a resting position and a velocity of the actuator, u is a control input to each actuator, e is a displacement of the actuator from the reference trajectory.

8. The method of claim 7, where in the cost function includes terms $$\|v_{ij}(k)\|_p, T_1 + \|w_{ij}(k)\|_p, T_2$$

where $T_1$ and $T_2$ are weighting matrices, v is a feedforward control input for minimizing error motions in undesirable directions resulting from an input to the actuator, and w is a feedforward component for minimizing a parasitic motion resulting from a cross-axis coupling between the redundant actuators.

9. The method of claim 1, wherein the minimization is performed offline for an entire reference trajectory.

10. The method of claim 1, wherein the reference trajectory is known only a finite number of samples ahead of a current time, comprising:
    minimizing the cost function using a receding horizon or moving horizon.

11. The method of claim 10, wherein the receding horizon or the moving horizon are sized based on a time-constant of a slow actuator.

12. The method of claim 1, further comprising:
    predicting an operation of the laser cutting machine based on a model of the laser cutting machine; and
    minimizing the cost function by solving a quadratic programming problem using fast quadratic programming solvers.

13. The method of claim 1, further comprising:
    controlling the operation of the redundant actuators using feedforward and feedback controllers.

14. A system for controlling a machine having redundant actuators operating the machine substantially concurrently along at least one direction, wherein the controlling operates the machine according to a reference trajectory, comprising:
    a processor for executing a cost function module, a constraints module, and an optimization module, wherein
        the cost function module determines a cost function representing operations of the redundant actuators over an interval of time;
        the constraints module determines constraints of operation of the machine based on the reference trajectory, parameters of the machine and parameters of the redundant actuators, wherein the constraints include at least one time-varying constraint representing the reference trajectory over the interval of time and at least one time-fixed constraint representing mechanics of the redundant actuators, wherein time-fixed constraint includes one or combination of inequality constraints on a range of motion, a velocity, an acceleration, and a torque of each actuator; and
        the optimization module minimizes the cost function subject to the constraints to produce a sequence of commands for each actuator forming the sequences of commands for the redundant actuators suitable for the controlling the machine; and
    controller for controlling the machine according to the sequences of commands.

15. The system of claim 14, wherein the machine is a laser cutting machine and the reference trajectory represents a cutting path of the laser cutting machine, such that the controlling positions a laser beam along the cutting path.

16. The system of claim 15, wherein the laser cutting machine includes a galvano assembly arranged on a platform, such that a motion of the platform along a first direction and along a second direction causes a motion of the galvano assembly along the first and the second directions, wherein an operation the galvano assembly directs a laser beam along a third direction, and along a fourth direction, and wherein mutual orientation of the first direction, the second direction, the third direction and the fourth direction is permanently fixed during an operation of the machine.

17. The system of claim 14, wherein, for each actuator, the cost function includes one or a combination of a state cost component for optimizing a displacement and a velocity of the actuator, a control cost component for optimizing a torque, an acceleration, an energy consumption and a vibration of the actuator, a tracking error component for optimizing a tracking error of the actuator.

18. A method for controlling a laser cutting machine having redundant actuators operating the machine substantially concurrently for at least one direction, wherein the controlling operates the machine according to a reference trajectory, comprising steps of:
    determining a cost function representing operations of the redundant actuators over an interval of time; and
    minimizing the cost function subject to constraints to produce a sequences of commands for the redundant actuators suitable for controlling the machine, wherein the constraints include at least one time-varying constraint representing the reference trajectory over the interval of time and at least one time-fixed constraint representing mechanics of the redundant actuators, wherein the time-varying constraint includes an equality constraint or an inequality constraint on a sum of position contributions resulting from operations of each actuator, and wherein time-fixed constraint includes one or combination of inequality constraints on a range of motion, a velocity, an acceleration, and a torque of each actuator, and wherein the steps of the method are perform by a processor.

* * * * *